(12) United States Patent
Chien et al.

(10) Patent No.: US 7,676,130 B2
(45) Date of Patent: Mar. 9, 2010

(54) OPTICAL FIBER COATING COMPOSITIONS

(75) Inventors: Ching-Kee Chien, Horseheads, NY (US); Edward J Fewkes, Horseheads, NY (US); Susan M Gasper, Corning, NY (US); Anita S Hill, Bath, NY (US); Gregory F Jacobs, Elmira, NY (US); Frederic C Wagner, Horseheads, NY (US); Michael J Winningham, Big Flats, NY (US); Randall E Youngman, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/336,096

(22) Filed: Jan. 20, 2006

(65) Prior Publication Data

US 2006/0115649 A1 Jun. 1, 2006

Related U.S. Application Data

(63) Continuation of application No. 10/077,166, filed on Feb. 15, 2002, now abandoned.

(60) Provisional application No. 60/275,421, filed on Mar. 13, 2001, provisional application No. 60/315,857, filed on Aug. 29, 2001.

(51) Int. Cl.
*G02B 6/02* (2006.01)
(52) U.S. Cl. .................. 385/128; 385/123; 428/378
(58) Field of Classification Search ............. 428/378; 522/96; 385/123, 126, 128
See application file for complete search history.

(56) References Cited

U.S. PATENT DOCUMENTS 4,511,209 A * 4/1985 Skutnik ............... 385/145
4,581,165 A   4/1986 Frank et al. .......... 260/112.5
4,593,974 A * 6/1986 Yamamoto et al. ...... 385/142

(Continued)

FOREIGN PATENT DOCUMENTS

CA   2107448   9/1993

(Continued)

OTHER PUBLICATIONS

"A Si solid-state magic angle spinning nuclear magnetic resonance study of TEOS-based hybrid materials", Peeters, M.P.J. et al, Journal of Non-Crystalline Solids 189 (1995), pp. 77-89.

(Continued)

*Primary Examiner*—Susan W Berman
(74) *Attorney, Agent, or Firm*—Timothy R. Krogh; Robert L. Carlson

(57) ABSTRACT

The invention includes a composition for an optical fiber coating. An inventive composition includes a non-thiol functional adhesion promoter and less than about 0.5 pph of a strength additive containing a thiol functional group. The invention further includes an optical fiber coated with the inventive composition. A second inventive composition includes a photo-polymerizable composition which contains an adhesion promoter and a non-silicon containing strength additive containing at least about one thiol functional group. A third inventive composition includes a photo-polymerizable composition which has a silane containing adhesion promoter and a strength additive containing at least about one halide functional group. The invention also includes an optical fiber coated with the inventive coating and methods of making an optical fiber including the inventive coating.

22 Claims, 13 Drawing Sheets

U.S. PATENT DOCUMENTS

| | | | |
|---|---|---|---|
| 4,608,409 A | 8/1986 | Coady et al. | 524/199 |
| 4,609,718 A | 9/1986 | Bishop et al. | 528/49 |
| 4,629,287 A | 12/1986 | Bishop | 350/96.34 |
| 4,690,502 A | 9/1987 | Zimmerman et al. | 350/96.29 |
| 4,744,830 A | 5/1988 | Kobayashi et al. | 106/205 |
| 4,798,852 A | 1/1989 | Zimmerman et al. | 522/96 |
| 4,851,165 A | 7/1989 | Rennell, Jr. et al. | 264/1.5 |
| 4,921,880 A | 5/1990 | Lee et al. | 522/12 |
| 4,962,992 A | 10/1990 | Chapin et al. | 350/96.23 |
| 4,968,116 A * | 11/1990 | Hulme-Lowe et al. | 385/145 |
| 5,104,433 A | 4/1992 | Chapin et al. | 65/3.1 |
| 5,146,531 A | 9/1992 | Shustack | 385/128 |
| 5,188,864 A | 2/1993 | Lee et al. | 427/515 |
| 5,527,835 A * | 6/1996 | Shustack | 522/42 |
| 5,664,041 A | 9/1997 | Szum | 385/128 |
| 5,690,863 A | 11/1997 | Schuman | 252/582 |
| 5,744,514 A | 4/1998 | Shustack | |
| 6,136,880 A * | 10/2000 | Snowwhite et al. | 522/64 |
| 6,187,835 B1 | 2/2001 | Szum et al. | 522/96 |
| 6,265,476 B1 * | 7/2001 | Krongauz et al. | 524/262 |
| 6,298,189 B1 | 10/2001 | Szum et al. | 385/128 |
| 6,559,197 B2 * | 5/2003 | Fewkes et al. | 522/172 |
| 6,563,996 B1 | 5/2003 | Winningham | 385/128 |
| 6,584,263 B2 | 6/2003 | Fewkes et al. | 385/128 |
| 7,010,205 B2 * | 3/2006 | Fabian et al. | 385/128 |

FOREIGN PATENT DOCUMENTS

| | | | |
|---|---|---|---|
| JP | 402008803 A | 1/1990 | |
| WO | WO98/33081 | 1/1998 | |
| WO | WO 00/66636 | 11/2000 | |
| WO | WO01/49624 | 7/2001 | |

OTHER PUBLICATIONS

"The Adhesion Promotion Mechanism of Organofunctional Silanes" P.H. Harding et al., Journal of Applied Polymer Science, vol. 67, pp. 1025-1033 (1998).

"Kinetics of the hydrolysis and condensation of organofunctional alkoxysilanes: a review", F.D. Osterholtz et al, Journal Adhesion Sci Technol vol. 6, No. 1, pp. 127-149 (1992).

"Influence of Steric Effects on the Kinetics of Ethyltrimethoxysilane Hydrolysis in a Fast Sol-Gel System" R. Carlisle Chambers, et al, Chem Mater, 1993, 5, pp. 1481-1486.

"A Silane Primer: Chemistry and Applications of Alkoxy Silanes" Gerald L. Witucki, Journal of Coatings Technology, vol. 65, No. 822, Jul. 1993, pp. 57-60.

"Si-NMR study of hydrolysis and initial polycondensation processes of organoalkoxysilanes. II Methyltriethoxysilane" Yoshiyuki Sugahara et al, Journal of Non-Crystalline Solids 167 (1994), pp. 21-28.

"Primary Coating Materials of Optical Fiber" Kimura, Takao et al. 1978, CAN 91:176723 AN 1979:576723 CAPLUS, SciFinder, abstract.

Handbook of Pressure Sensitive Adhesive Technology, Donatas Satas, 1999, pp. 36-37, 57-61, 169, 173-174.

* cited by examiner

Error bars indicate a 7% coefficient of variance for the modulus measurements

Relative Cure Speed as a Function of Mercaptopropyltrimethoxysilane Concentration Plot of relative peak intensity of the four major Bis-silane isomers as a function of reaction time in THF, water and acid.

■ denote Bis-silane solution (control) and ★ denotes Bis-silane with Mercapto-silane solution (test), respectively. Solid curves represent first-order exponential decay fits to the experimental data.

Total Bis-silane concentrations for coating 122 (control coating), as determined by $^{29}$Si NMR measurements as 25, 35, and 60 °C.

Solid curves represent exponential decay fits to the data.

Total Bis-silane levels in coating 124 (test coating) as determined by in-situ $^{29}$Si MAS NMR measurements at 25, 35 and 60 °C.

- ◆ Total Bis @ 25C
- △ Total Bis @ 35C
- ○ Total Bis @ 60C

The curve represents the first-order decay behavior of the data 60 °C.

OPTICAL FIBER COATING COMPOSITIONS

RELATED APPLICATION

This application is a continuation of U.S. patent application Ser. No. 10/077,166 filed on Feb. 15, 2002 now abandoned, and claims the benefit of and priority thereto, which claims the benefit of U.S. Provisional Patent Application Nos. 60/275,421, filed Mar. 13, 2001, and 60/315,857, filed Aug. 29, 2001, which are incorporated herein by reference in their entirety.

BACKGROUND OF THE INVENTION

1. Field of the Invention

The present invention relates generally to optical fibers (hereinafter fiber), and particularly to fiber coatings.

2. Technical Background

Fiber has acquired an increasingly important role in the field of telecommunications, frequently replacing existing copper wires. This trend has had a significant impact in all areas of telecommunications, which has seen a vast increase in the usage of fiber. Further increases in the use of fiber is at least foreseen in local loop telephone and cable TV service, as local fiber networks are established to deliver ever greater volumes of information in the form of data, audio, and video signals to residential and commercial users. In addition, use of fiber in home and commercial business environments for internal data, voice, and video communications has begun and is expected to increase. Fibers typically contain a glass core and at least two coatings, e.g. a primary (inner) coating and a secondary (outer) coating. The primary coating is applied directly to the glass fiber and, when cured, forms a soft, elastic, and compliant material which encapsulates the glass fiber. The primary coating serves as a buffer to cushion and protect the glass fiber core when the fiber is bent, cabled, or spooled. The secondary coating is applied over the primary coating and functions as a tough, protective outer layer that prevents damage to the glass fiber during processing and use.

Corrosion of the glass surface of the optical fiber will lead to degradation of the optical fiber strength and may even cause the optical fiber to break. A known cause of the corrosion is a base compound (compounds having a pH of greater than about 7.0 e.g. a hydroxide ion) reacting with the glass surface. The base may be generated from the environment which the optical fiber is employed, however, the potential source of the base is not limited to the environment. A need exists to improve fiber strength and also to prevent the base from causing the glass surface of the optical fiber to corrode.

SUMMARY OF THE INVENTION

One aspect of the invention relates to an optical fiber coating composition. The composition includes a non-thiol functional adhesion promoter and less than about 0.5 pph of a strength additive containing a thiol functional group. This aspect of the invention also includes a coated optical fiber which includes the fiber coated with the aforementioned inventive coating composition. Another aspect of the invention relates to a method of manufacturing an optical fiber. The method includes drawing an optical fiber from a sintered preform and coating the fiber with an optical fiber coating comprising of a non-thiol functional adhesion promoter and less than about 0.5 pph of a strength additive containing a thiol functional group.

An additional aspect of the invention relates to an optical fiber coating which includes a photo-polymerizable composition containing a silane adhesion promoter and a non-silicon containing strength additive having at least about one thiol functional group. A further aspect of the invention relates to an optical fiber coating which includes a photo-polymerizable composition which includes preferably a silane containing adhesion promoter and a strength additive having at least one halide containing compound.

An optical fiber coated with the inventive composition has exhibited the advantage of superior strength retention, also the coated fiber has exhibited more resistant to wet environments than fibers coated with traditional coatings. The coated fiber has demonstrated excellent performance in impeding the migration of a base from coming in contact with the glass surface of the coated fiber.

Also, the fiber coated with the inventive coating exhibited good fiber performance characteristics such as good ribbon strippability, satisfactory attenuation losses, and satisfactory tensile properties such as Young's modulus. Furthermore, the inclusion of the inventive strength additive in the coating composition did not significantly inhibit the cure rate of the coating composition. Additionally, the inventive coating has exhibited an improved shelf life, increased adhesion promoter activity, improved reduction in attenuation, improved microbend resistance, and greater temperature stability.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Figure 1:
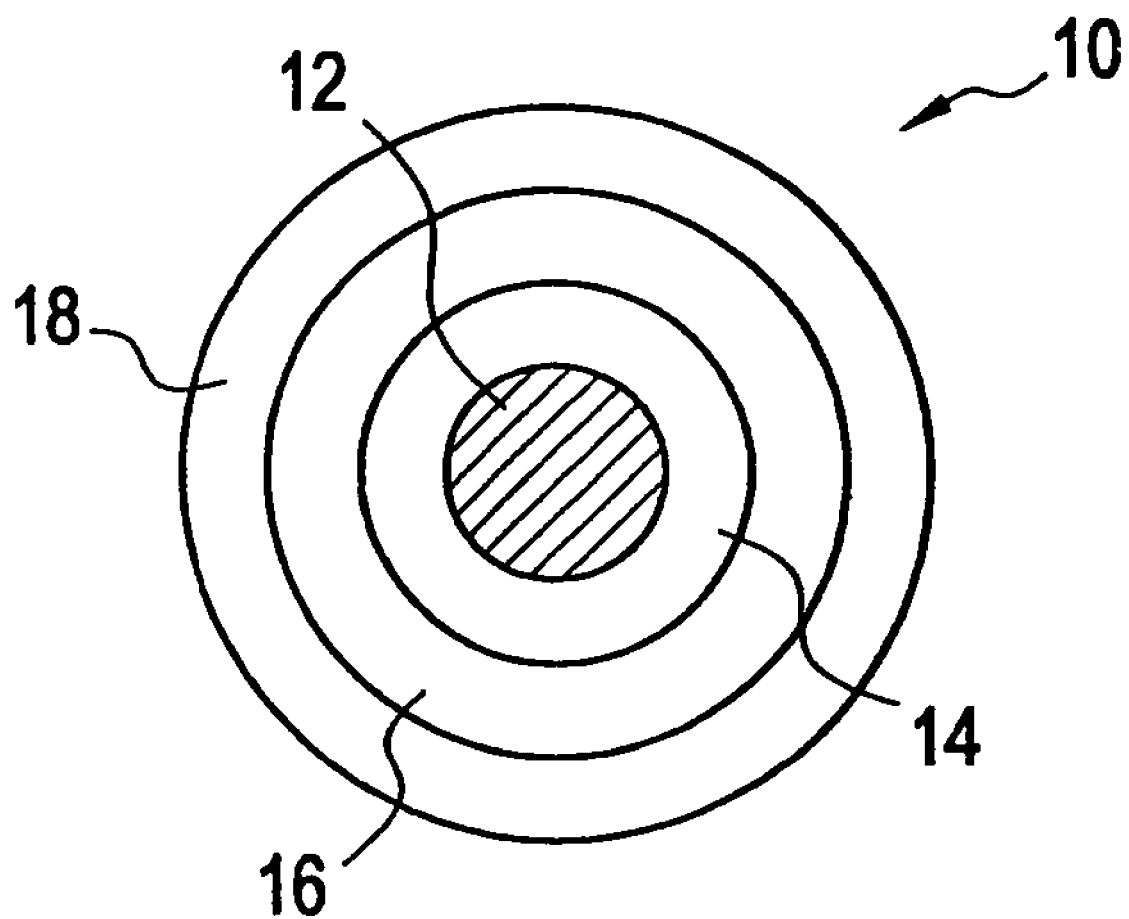
FIG. 1 is a cross sectional view of a coated optical fiber.

Reference will now be made in detail to the present preferred embodiments of the invention, an example of which is illustrated in the accompanying drawings. Wherever possible, the same reference numbers will be used throughout the drawings to refer to the same or like parts. An exemplary embodiment of the optical fiber coating of the present invention is shown in FIG. 1, and is designated generally throughout by reference numeral 10.

The invention includes a composition for coating an optical fiber. The inventive composition is preferably a photo-polymerizable composition which includes an adhesion promoter as described below and preferably less than about 0.5 pph of a strength additive which includes at least about one thiol functional group. Preferably the adhesion promoter does not contain a thiol functional group. More preferably, the strength additive is an organic compound and preferably includes at least one element from the group of elements consisting of C, H, N, O, Si, P, F, Cl, Br, I, Ti, Zr, S and mixtures thereof, in addition to the S element of the thiol functional group. Most preferably, the organic strength additive is an alkyl thiol compound. The strength additive may be a thiol functional compound that is substantially devoid of silicon.

Preferably, the alkyl thiol comprises at least one compound selected from the following group of compounds consisting of methane thiol, ethane thiol, hexane thiol, dodecane thiol, octadecane thiol, a cysteine derivative, a multi-functional thiol, a thiol silane, thiol-functional polysulfides, and mixtures thereof.

Examples of specific preferred strength additive compounds includes at least one compound selected from the group of compounds consisting of N-(tert butoxy carbonyl)-L-cysteine methyl ester, pentaerythritol tetrakis (3-mercaptopropionate), 3-mercaptopropyltriethoxy silane, 3-mercaptopropyltrimethoxy silane, (commercially available from United Chemical Technologies of Bristol, Pa.) dodecylmercaptan, tert-dodecylmercaptan, (commercially available from Aldrich of Milwaukee, Wis.) and mixtures thereof.

Preferably, the thiol functional strength additive is present in the composition in a concentration of at least about 0.01 pph and optionally up to less than about 0.5 pph, more preferably about 0.1 pph to about 0.4 pph, and most preferably about 0.3 pph. Maintaining the concentration of the thiol functional strength additive to less than about 0.5 pph has been found to not inhibit the cure speed of the inventive composition to a significant extent or degrade the tensile properties of the coating once the coating is applied to an optical fiber and cured. However, the thiol functional strength additive devoid of silicon is not limited to less than about 0.5 pph, e.g. pentaerythritol tetrakis (3-mercaptopropionate).

Additional strength additives have the general formula RX where R is an organic group and X is a group that may be ionized when the strength additive, RX, undergoes a nucleophilic reaction (either substitution or addition). Preferable examples of X include fluorine, chlorine, bromine and iodine. Exemplary strength additives of RX include alkyl-halides, haloalkyl-alkoxy silanes, halo aryl-alkyl silanes, and haloalkylsilanes. Preferably halides include any of the known elements of column VII A of the Periodic Chart of Elements. Preferable compounds include chloro-octane, chloro-propyltriethoxy silane, and chloro-propyltrimethoxy silane. Optionally, the alkyl-halides may be devoid of silicon. The alkyl-halide, halo alkyl-alkoxy silanes, halo aryl-alkyl silanes, and halo-alkylsilane strength additives may be used in a concentration of more than about 0.5 pph, unlike the aforementioned thiol functional strength additives. A chloro group is an example of a preferred halo group.

Preferably the strength additive is not a base compound, more preferably the strength additive is devoid of an amine functional group. It is also preferred that the strength additive is not a chain transfer agent. A chain transfer is a chain terminating reaction. A chain transfer agent interrupts the growth of molecule chain by the formation of a new radical. A chain transfer agent has detrimental effects on the coating that can include changing the rate of cure of the coating and changing the tensile properties of the coating by changing the coating network. Typically, the chain transfer agent will reduce the rate of cure of the coating. As for the change in tensile properties, the strength additive will change the Young's modulus of the cured coating by less than about 30%, preferably less than about 25%, more preferably less than about 20%, and most preferably less than about 15%.

In one embodiment of the invention, preferably the strength additive acts as a water scavenger. Preferably the strength additive comprises a silane containing compound and the strength additive has a faster rate of reaction with residual water in the coating formulation than the rate of reaction of a reaction between the adhesion promoter and residual water in the coating formulation. Any example of the hydrolysis of preferred strength additive is shown below.

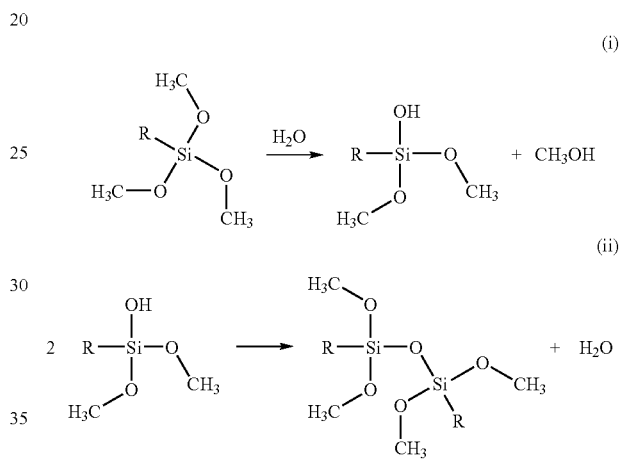

The above chemical reaction is a schematic showing the (i) hydrolysis and (ii) condensation chemistry of a generic trimethoxy silane. The R-group denotes any organic functionality, such as a long-chain or cyclic hydrocarbon.

As shown, the methoxy groups react first with water in the coating formulation. Subsequently, the hydroxyl group will react with other silanols present in the formulation. By way of example, the coating formulation could include a bis-silane adhesion promoter and a mercapto-silane strength additive. The mercapto-silane strength additive would react with the water in the coating at least as fast, preferably faster, than the bis-silane adhesion promoter.

One method to determine if a molecule is a water scavenger is to compare the reactivity of the molecule with water to the reactivity of the adhesion promoter with water. Solution chemistry may be used to compare the reactivity of the molecule with water relative to the reactivity of the adhesion promoter with water. A solution of the adhesion promoter and a solvent is prepared as well as at least one of the two following solutions (1) a solution of the molecule and the same solvent, or (2) a solution of the molecule, the adhesion promoter, and the solvent. An aliquot of water and acid is added to both of the solutions to initiate the hydrolysis reaction. The aliquot should be the same for each solution.

Gas chromatography/mass spectrometry techniques may be used to determine the reactivity of molecule and the adhesion promoter relative to an internal standard as a function of time. An example of a suitable internal standard is cyclohexyl-phenylketone. The peak intensity of the adhesion promoter and the molecule relative to the internal standard is determined periodically over a pre-determined time period. In determining the peak intensity, the concentration of the adhesion promoter or the molecule in the solution is determined as a function of time as the adhesion promoter or the molecule reacts with the water in the solution.

For the molecule to act as a water scavenger, the rate of reaction between water and the molecule must be equal to or greater than that of the rate of reaction between water and the adhesion promoter. In order to reduce the overall rate of reaction between the adhesion promoter and water, the molecule must effectively lower the water concentration by reacting with the water, thereby reducing the amount of water available to react with the adhesion promoter.

A non-exhaustive list of examples of strength additives that act as a water scavenger will include thiol functional silanes, amino-silanes, and combinations thereof.

Preferably, the aforementioned inventive coating composition is applied to an optical fiber as the primary (inner) coating. However, the invention is not limited a primary coating.

Now referring to the drawings, shown in FIG. 1 is a cross sectional view of a coated optical fiber 10. Referring to FIG. 1, the optical fiber 10 includes a glass core 12, a cladding layer 14 surrounding and adjacent to glass core 12, a primary coating material 16 which adheres to cladding layer 14, and one or more secondary (outer) coating materials 18 surrounding and adjacent to the primary coating material 16. The components of the optical fiber of the present invention can optionally include a coloring material, such as a pigment or dye, or an additional colored ink coating may surround coating 18.

Any conventional material can be used to form glass core 12, such as those described in U.S. Pat. No. 4,486,212 to Berkey, which is hereby incorporated by reference. The core is typically a silica glass having a cylindrical cross section and a diameter ranging from about 5 to about 10 µm for single-mode fibers and about 20 to about 100 µm for multi-mode fibers. The core can optionally contain varying amounts of other material such as, e.g., oxides of titanium, thallium, germanium, and boron, which modify the core's refractive index. Other dopants which are known in the art can also be added to the glass core to modify its properties.

Cladding layer 14 preferably has a refractive index which is less than the refractive index of the core. A variety of cladding materials, both plastic and glass (e.g., silicate and borosilicate glasses) are used in constructing conventional glass fibers. Any conventional cladding materials known in the art can be used to form cladding layer 14 in the optical fiber of the present invention.

A preferred type of fiber is single mode fiber (having a core diameter of less than about 10 µm) with a large effective area, e.g. LEAF®, from Corning, Incorporated of Corning, N.Y.

Fiber Definitions

The effective area is

Aeff=$2\pi(\int E^2 \, r \, dr)^2/(\int E^4 \, r \, dr)$, where the integration limits are 0 to $\infty$, and E is the electric field associated with light propagated in the waveguide. An effective diameter, Deff, may be defined as, $$Aeff = \pi(Deff/2)^2.$$

By large effective area, we mean that the effective area of the fiber is greater than about 60 µm2, more preferably the effective area of the fiber is greater than about 65 µm2, and most preferably the effective area of the fiber is greater than 70 µm2. It is possible and preferable to have a fiber with an effective area of greater than about 80 to 90 µm2.

The relative refractive index percent, $\Delta\% = 100 \times (n_i^2 - n_c^2)/2n_i^2$, where $n_i$ is the maximum refractive index in region i, unless otherwise specified, and $n_c$ is the average refractive index of the cladding region unless otherwise specified.

The term α-profile refers to a refractive index profile, expressed in terms of $\Delta(b)\%$, where b is radius, which follows the equation, $\Delta(b)\% = \Delta(b_o)(1-[|b-b_o|]/(b_1-b_o)]\alpha)$, where $b_o$ is the point at which $\Delta(b)\%$ is maximum, $b_1$ is the point at which $\Delta(b)\%$ is zero, and b is in the range $b_i < b < b_f$, where delta is defined above, $b_i$ is the initial point of the α-profile, $b_f$ is the final point of the α-profile, and α is an exponent which is a real number. The initial and final points of the α-profile are selected and entered into the computer model. As used herein, if an α-profile is preceded by a step index profile or any other profile shape, the beginning point of the α-profile is the intersection of the α-profile and the step profile or other profile.

The above coating components of an adhesion promoter or a strength additive are preferably incorporated into coating 16. However, the adhesion promoter or the strength additive may also be incorporated into coating 18 or an ink layer instead of coating 16, or in any combination of coatings 16, 18 and the ink layer. In an alternate embodiment, the strength additive and the adhesion promoter are incorporated into a single coating that is applied to an optical fiber. Coatings 16 and 18 are not thermoplastics. Nor do coatings 16 and 18 exhibit the properties of a thermoplastic resin, that the resin may be reversibly heated, melted, and reformed. Coatings 16 and 18 are typically crosslinked coatings. A preferred component of the primary coating composition of the present invention is an oligomer. Preferably the oligomer is an ethylenically unsaturated oligomer, more preferably a (meth)acrylate oligomer. By (meth)acrylate, it is meant an acrylate or a methacrylate. The (meth)acrylate terminal groups in such oligomers may be provided by a monohydric poly(meth)acrylate capping component, or by a mono(meth)acrylate capping component such as 2-hydroxyethyl acrylate, in the known manner. It is also preferred that the oligomer is capable of participating in addition polymerization. It is further preferred that the oligomer includes at least one urethane functional group. It is additionally preferred that the oligomer does not include a thiol functional group.

Urethane oligomers are conventionally provided by reacting an aliphatic or aromatic diisocyanate with a dihydric polyol based on a polyether, a polyester, or a hydrocarbon, most typically a polyoxyalkylene glycol such as a polyethylene glycol. Such oligomers typically have 4-10 urethane groups and may be of high molecular weight, e.g., 2000-8000. High molecular weight oligomers, with molecular weights as high as 15000, may also be used. However, lower molecular weight oligomers, having molecular weights in the 500-2000 range, may also be used. U.S. Pat. No. 4,608,409 to Coady et al. and U.S. Pat. No. 4,609,718 to Bishop et al., the specifications of which are hereby incorporated by reference, describe such syntheses of the oligomers in detail.

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from 2-250 carbon atoms and, preferably, ate substantially free of ether or ester groups. The ranges of oligomer viscosity and molecular weight obtainable in these systems are similar to those obtainable in unsaturated, polar oligomer systems, such that the viscosity and coating characteristics thereof can be kept substantially unchanged. The reduced oxygen content of these coatings has been found not to unacceptably degrade the adherence characteristics of the coatings to the surfaces of the glass fibers being coated.

Polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently non-polar and saturated as to avoid compromising the moisture resistance of the system.

Thus, it is desirable for the primary coating composition of the present invention to contain at least one ethylenically unsaturated oligomer, although more than one oligomer component can be introduced into the composition. Preferably, the oligomer(s) is present in an amount between about 10 to about 90 percent by weight, more preferably between about 35 to about 75 percent by weight, and most preferably between about 40 to about 65 percent by weight.

Suitable ethylenically unsaturated oligomers for primary coatings include polyether urethane acrylate oligomers (e.g., CN986 available from Sartomer Company, Inc., (West Chester, Pa.)) and BR3731 and STC3-149 available from Bomar Specialty Co. (Winstead, Conn.)), acrylate oligomers based on tris(hydroxyethyl)isocyanurate, (available from Sartomer Company, Inc.), (meth)acrylated acrylic oligomers, (available from Cognis (Ambler, Pa.), polyester urethane acrylate oligomers (e.g., CN966 and CN973 available from Sartomer Company, Inc. and BR7432 available from Bomar Specialty Co.), polyurea urethane acrylate oligomers (e.g., oligomers disclosed in U.S. Pat. Nos. 4,690,502 and 4,798,852 to Zimmerman et al., U.S. Pat. No. 4,609,718 to Bishop, and U.S. Pat. No. 4,629,287 to Bishop et al.), polyether acrylate oligomers (e.g., Genomer 3456 available from Rahn AG (Zurich, Switzerland), polyester acrylate oligomers (e.g., Ebecryl 80, 584, and 657 available from UCB Radcure (Atlanta, Ga.)), polyurea acrylate oligomers (e.g., oligomers disclosed in U.S. Pat. Nos. 4,690,502 and 4,798,852 to Zimmerman et al., U.S. Pat. No. 4,609,718 to Bishop, and U.S. Pat. No. 4,629,287 to Bishop et al., the specifications of which are hereby incorporated by reference), epoxy acrylate oligomers (e.g., CN120 available from Sartomer Company, Inc., and Ebecryl 3201 and 3604 available from UCB Radcure), hydrogenated polybutadiene oligomers (e.g., Echo Resin MBNX available from Echo Resins and Laboratory (Versailles, Mo.)), and combinations thereof.

Furthermore, the coating compositions of the invention will typically include at least one monomer component. Preferably, the monomer is an ethylenically unsaturated monomer, more preferably a (meth)acrylate monomer. Generally, suitable monomers are those for which the resulting homopolymer would have a glass transition temperature (Tg) of at most about 20° C., preferably at most about 10° C. Generally, a lower molecular weight (i.e., preferably less than about 2000, more preferably about 120 to 600) liquid (meth)acrylate-functional monomer is added to the formulation to provide the liquidity needed to apply the coating composition with conventional liquid coating equipment. Typical acrylate-functional liquids in these systems include monofunctional and polyfunctional acrylates (i.e., monomers having two or more acrylate functional groups). Illustrative of these polyfunctional acrylates are the difunctional acrylates, which have two functional groups; the trifunctional acrylates, which have three functional groups; and the tetrafunctional acrylates, which have four functional groups. Monofunctional and polyfunctional methacrylates may also be employed.

When it is desirable to utilize moisture-resistant components, the monomer component will be selected on the basis of its compatibility with the selected moisture-resistant oligomer. For satisfactory coating compatibility and moisture resistance, it is desirable to use a liquid acrylate monomer component comprising a predominantly saturated aliphatic mono- or di-acrylate monomer or alkoxy acrylate monomers.

Thus, it is desirable for the primary coating composition to contain at least one ethylenically unsaturated monomer, although more than one monomer can be introduced into the composition. Preferably, the ethylenically unsaturated monomer is present in an amount between about 10 to about 90 percent by weight, more preferably between about 20 to about 60 percent by weight, and most preferably between about 25 to about 50 percent by weight.

Suitable ethylenically unsaturated monomers include lauryl acrylate (e.g., SR335 available from Sartomer Company, Inc., Ageflex FA12 available from CPS Chemical Co. (Old Bridge, N.J.), and Photomer 4812 available from Cognis f.k.a. Henkel (Ambler, Pa.)), ethoxylatednonylphenol acrylate (e.g., SR504 available from Sartomer Company, Inc. and Photomer 4003 available from Cognis), caprolactone-acrylate (e.g., SR495 available from Sartomer Company, Inc., and Tone M100 available from Union Carbide Company (Danbury, Conn.)), phenoxyethyl acrylate (e.g., SR339 available from Sartomer Company, Inc., Ageflex PEA available from CPS Chemical Co., and Photomer 4035 available from Cognis), isooctyl acrylate (e.g., SR440 available from Sartomer Company, Inc. and Ageflex FA8 available from CPS Chemical Co.), tridecyl acrylate (e.g., SR489 available from Sartomer Company, Inc.), phenoxyglycidyl acrylate (e.g., CN131 available from Sartomer Company, Inc.), lauryloxyglycidyl acrylate (e.g., CN130 available from Sartomer Company, Inc.), isobornyl acrylate (e.g., SR506 available from Sartomer Company, Inc. and Ageflex IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and Ageflex FA10 available from CPS Chemical Co.), 2-(2-ethoxyethoxy)ethyl acrylate (e.g., SR256 available from Sartomer Company, Inc.), and combinations thereof.

Optical fiber coating compositions may also contain a polymerization initiator which is suitable to cause polymerization (i.e., curing) of the composition after its application to a glass fiber. Polymerization initiators suitable for use in the primary coating compositions of the present invention include thermal initiators, chemical initiators, electron beam initiators, and photoinitiators. Particularly preferred are the photoinitiators. For most acrylate-based coating formulations, conventional photoinitiators, such as the known ketonic photoinitiating and/or phosphine oxide additives, are preferred. When used in the compositions of the present invention, the photoinitiator is present in an amount sufficient to provide rapid ultraviolet curing. Generally, this includes between about 0.5 to about 10.0 percent by weight, more preferably between about 1.5 to about 7.5 percent by weight.

The photoinitiator, when used in a small but effective amount to promote radiation cure, must provide reasonable cure speed without causing premature gelation of the coating composition. A desirable cure speed is any speed sufficient to cause substantial curing of the coating materials. As measured in a dose versus modulus curve, a cure speed for coating thickness' of about 25-35 μm is, e.g., less than 1.0 J/cm2, preferably less than 0.5 J/cm2.

Suitable photoinitiators include a blend of 1-hydroxycyclohexylphenyl ketone and bis(2,6-dimethoxybenzoyl)-2,4,4-trimethylpentylphosphine oxide (Irgacure 1850, available from Ciba Specialty Chemical (Tarrytown, N.Y.)), 1-hydroxycyclohexylphenyl ketone (e.g., Irgacure 184 available from Ciba Specialty Chemical (Hawthorne, N.Y.), (2,6-dimethoxybenzoyl)-2,4,4-trimethylpentyl phosphine oxide (e.g., commercial blends Irgacure 1800, 1850, and 1700 available from Ciba Specialty Chemical), 2,2-dimethoxyl-2-phenyl acetophenone (e.g., Irgacure 651, available from Ciba Specialty Chemical), bis(2,4,6-trimethyl benzoyl)phenyl-phosphine oxide (Irgacure 819), (2,4,6-trimethylbenzoyl) diphenyl phosphine oxide (Lucerin TPO, available from BASF (Munich, Germany)), ethoxy (2,4,6-trimethylbenzoyl) phenyl phosphine oxide (Lucerin TPO-L from BASF), and combinations thereof.

As used herein, the weight percent of a particular component in coating 16, coating 18, or the ink refers to the amount introduced into the bulk composition excluding the adhesion promoter and other additives. The amount of adhesion promoter and various other additives that are introduced into the bulk composition to produce a composition of the present invention is listed in parts per hundred. For example, an oligomer, monomer, and photoinitiator are combined to form the bulk composition such that the total weight percent of these components equals 100 percent. To this bulk composition, an amount of adhesion promoter, for example 1.0 part per hundred, is introduced in excess of the 100 weight percent of the bulk composition.

The coating composition may also include an adhesion promoter. It is preferred that the adhesion promoter includes a compound containing a cyclic structure interposed between at least two reactive silanes which are independently an alkoxysilane or a halosilane. It is further preferred that the adhesion promoter does not include a thiol functional group.

The cyclic structure can be a hydrocarbon cyclic structure or a heterocyclic structure or a combination thereof. Hydrocarbon cyclic structures and heterocyclic structures can be single-ring, fused-ring, or multi-ring structures, with or without hydrocarbon or hetero-substituents. Suitable hydrocarbon cyclic structures include, but are not limited to, cycloalkanes, preferably containing between 3 to 10, more preferably 5 to 6 carbon atoms per cyclic structure; cycloalkenes, preferably containing between 3 to 10, more preferably 5 to 6 carbon atoms per cyclic structure; cycloalkyldienes, preferably containing between 3 to 10, more preferably 5 to 6 carbon atoms per cyclic structure; substituted aliphatic rings; aromatic rings; and substituted aromatic rings. Preferably the hydrocarbon cyclic structure is an aromatic ring or a substituted aromatic ring. Exemplary hydrocarbon cyclic structures include, but are not limited to, benzene, naphthalene, cyclohexane, cyclohexene, etc. Suitable heterocyclic structure include those which contain oxygen, nitrogen, sulfur, or phosphorous hetero atom(s) within the ring structure. Exemplary heterocyclic structures include, but are not limited to, pyridines, pyrroles, imidazoles, indoles, pyrimidines, pyrrolidines, piperidines, furans, thiophenes, etc.

The at least two reactive silanes can independently be an alkoxysilane, a dialkoxysilane, a trialkoxysilane or any other suitable polyalkoxysilane, a halosilane, a dihalosilane, or a trihalosilane. Preferably, the at least two reactive silanes are independently dialkoxysilanes, trialkoxysilanes, or trihalosilanes. Suitable alkoxysilanes, polyalkoxysilanes, dialkoxysilanes, and trialkoxysilanes include alkoxy groups independently having between 1 and 6 carbon atoms. A preferred halosilane is a chlorosilane, more preferably a trichlorosilane.

The compound can also include a substituent interposed between the cyclic structure and one (or more) of the at least two alkoxysilanes. Suitable substituents include straight-chain alkylene groups having between 1 and 12 carbon atoms; branched-chain alkylene groups having between 1 and 12 carbon atoms; straight and branched-chain alkylene groups having a heterogroup; and a heterogroup including, but not limited to, oxygen, nitrogen, sulfur, phosphorous, selenium, titanium, zirconium, and silicon.

Preferred compounds include bis(trimethoxysilylethyl)benzene and bis(triethoxysilylethyl)benzene. Bis(trimethoxysilylethyl)benzene is commercially available from Gelest (Tellytown, Pa.), Archimica (Wilmington, Del.), and United Chemical Technologies, Inc. (Bristol, Pa.). Bis(triethoxysilylethyl)benzene can be synthesized from bis(trimethoxysilylethyl)benzene by trans-esterification with ethanol.

Compounds containing at least one zirconate or titanate functional group can be a suitable alternate adhesion promoter. In the case that the adhesion promoter includes a titanate containing compound, suitable compounds consists of least one of the following group of compounds consisting of tetra (2, 2 diallyoxymethyl)butyl, di(ditridecyl)phosphito titanate (commercially available as KR 55, from Kenrich Petrochemicals, Inc. (hereinafter Kenrich) Bayonne, N.J.), neopentyl(diallyl)oxy, trineodecanonyl titanate (commercially available as LICA 01 from Kenrich), neopentyl(diallyl)oxy, tri(dodecyl)benzene-sulfony titanate (commercially available as LICA 09 from Kenrich), neopentyl(diallyl)oxy, tri(dioctyl)phosphato titanate (commercially available as LICA 12 from Kenrich), neopentyl(dially)oxy, tri(dioctyl)pyro-phosphato titanate (commercially available as LICA 38 from Kenrich), neopentyl(diallyl)oxy, tri(N-ethylenediamino)ethyl titanate (commercially available as LICA 44 from Kenrich), neopentyl(diallyl)oxy, tri(m-amino)phenyl titanate (commercially available as LICA 97 from Kenrich), neopentyl(diallyl)oxy, trihydroxy caproyl titanate (formerly available as LICA 99 from Kenrich), and mixtures thereof.

Preferably, the titanate containing compound contains at least one UV curable functional group. More preferably, the functional group is a (meth)acrylate or acrylate functional group.

In case that the adhesion promoter consists of a zirconate containing compound, preferably the coupling agent consists of at least one ethylenically unsaturated zirconate containing compound, and more preferably at least one neoalkoxy zirconate containing compound. Most preferably, the zirconate containing compound consists of least one of the following group of compounds consisting of tetra (2, 2 diallyloxymethyl)butyl, di(ditridecyl)phosphito zirconate (commercially available as KZ 55 from Kenrich), neopentyl(diallyl)oxy, trineodecanoyl zirconate (commercially available as NZ 01 from Kenrich), neopentyl(diallyl)oxy, tri(dodecyl)benzene-sulfony zirconate (commercially available as NZ 09 from Kenrich), neopentyl(diallyl)oxy, tri(dioctyl)phosphato zirconate (commercially available as NZ 12 from Kenrich), neopentyl(diallyl)oxy, tri(dioctyl)pyrophosphato zirconate (commercially available as NZ 38 from Kenrich), neopentyl (diallyl)oxy, tri(N-ethylenediamino)ethyl zirconate (commercially available as NZ 44 from Kenrich), neopentyl(diallyl)oxy, tri(m-amino)phenyl zirconate (commercially available as NZ 97 from Kenrich), neopentyl(diallyl)oxy, trimethacryl zirconate (commercially available as NZ 33 from Kenrich), neopentyl(diallyl)oxy, triacryl zirconate (formerly available as NZ 39 from Kenrich), dineopentyl(diallyl)oxy, diparamino benzoyl zirconate (commercially available as NZ 37 from Kenrich), dineopentyl(aiallyl)oxy, di(3-mercapto)

propionic zirconate (commercially available as NZ 66A from Kenrich), and mixtures thereof.

Preferably, the zirconate containing compound contains at least one UV curable functional group. More preferably, the functional group is a (meth)acrylate or acrylate functional group.

Preferably the adhesion promoter is present in an amount between about 0.1 to about 15 parts per hundred, more preferably between about 0.25 to about 4 parts per hundred, most preferably between about 0.5 to about 3 parts per hundred.

In addition to the above-described components, the primary coating composition of the present invention can optionally include any number of additives, such as reactive diluents, antioxidants, catalysts, lubricants, co-monomers, low molecular weight non-crosslinking resins, and stabilizers. Some additives (e.g. chain transfer agents, for example) can operate to control the polymerization process, thereby affecting the physical properties (e.g., modulus, glass transition temperature) of the polymerization product formed from the primary coating composition. Others can affect the integrity of the polymerization product of the primary coating composition (e.g., protect against de-polymerization or oxidative degradation).

A preferred catalyst is a tin-catalyst, which is used to catalyze the formation of urethane bonds in some oligomer components. Whether the catalyst remains as an additive of the oligomer component or additional quantities of the catalyst are introduced into the composition of the present invention, the presence of the catalyst can act to stabilize the oligomer component in the composition.

A preferred antioxidant is thiodiethylene bis[(3,5-di-tert-butyl-4-hydroxy) hydrocinnamate] (e.g., Irganox 1035, available from Ciba Specialty Chemical). However, an antioxidant is not required in the composition to practice the invention.

The coating composition may include an oligomer capable of being polymerized, a monomer suitable to control the viscosity of the composition, an adhesion promoter that includes a compound containing at least one reactive silane, and a carrier.

The carrier is preferably a carrier which functions as a carrier surfactant or ambiphilic reactive or non-reactive surfactant. Reactive surfactants which are partially soluble or insoluble in the composition are particularly preferred. Without being bound to a particular theory, it is believed that carriers which function as reactive surfactants interact with the compound containing a reactive silane by depositing such compounds on the glass fiber, where it is allowed to react. It is desirable for the carrier to be present in an amount between about 0.01 to about 10 parts per hundred, more preferably about 0.25 to about 3 parts per hundred.

Suitable carriers, more specifically carriers which function as reactive surfactants, include polyalkoxypolysiloxanes. A preferred carrier is available from Goldschmidt Chemical Co. (Hopewell, Va.) under the tradename Tegorad 2200, and reactive surfactant Tegorad 2700 (acrylated siloxane) also from Goldschmidt Chemical Co.

Other classes of suitable carriers are polyols and non-reactive surfactants. Examples of suitable polyols and non-reactive surfactants include polyol Acclaim 3201 (poly(ethylene oxide-co-propylene oxide)) available from Bayer (formerly known as Lyondel), Newtown Square, Pa., and non-reactive surfactants Tegoglide 435 (polyalkoxy-polysiloxane) available from Goldschmidt Chemical Co. The polyol or non-reactive surfactants may be present in a preferred amount between about 0.01 pph to about 10 pph. Suitable carriers may also be amphiphilic molecules. An amphiphilic molecule is a molecule that has both hydrophilic and hydrophobic segments. The hydrophobic segment may alternatively be described as a lipophilic (fat/oil loving) segment.

A tackifier is also an example of a suitable carrier. A tackifier is a molecule that can modify the time-sensitive rheological property of a polymer product, such as, but not limited to, viscosity. In general a tackifier additive will make a polymer product act stiffer at higher strain rates or shear rates and will make the polymer product softer at low strain rates or shear rates. A tackifier is an additive commonly used in the adhesives industry, that enhances the ability of a coating to create a bond with an object that the coating is applied upon. For additional background regarding tackifiers and tackifier resins, the Handbook of Pressure Sensitive Adhesive Technology, 3rd Edition, D. Satas, (1999) (Warwick, R.I.: Satas and Associates) is incorporated herein by reference, see pages 36, 37, 57-61, 169, 173, 174, and 609-631.

Preferred tackifiers are those classified as a terpene base resin, coumarone base resin, petroleum resin, hydrogenated petroleum resin, styrene resin, phenol resins, or rosin base resin. It is preferred that the tackifiers are nonepoxidized. The rosin base resins include unmodified rosin (e.g., wood, gum, or tall oil) and rosin derivatives. Rosin base resins can be classified by their rosin acids, which are either an abietic acid or a pimaric acid. Abietic acid type rosins are preferred. Rosin derivatives include polymerized rosin, disproportionated rosin, hydrogenated rosin, and esterified rosin. Representative examples of such rosin derivatives include pentaerythritol esters of tall oil, gum rosin, wood rosin, or mixtures thereof.

The terpene base resins include terpene polymers of α-pinene, β-pinene, dipentel, limonene, myrcene, bornylene and camphene, and phenol-modified terpene base resins obtained by modifying these terpene base resins with phenols.

The coumarone base resins include, for example, coumarone-indene resins and phenol-modified coumarone-indene resins.

Petroleum and hydrogenated petroleum resins include aliphatic petroleum resins, alicyclic petroleum resins, aromatic petroleum resins using styrene, α-methylstyrene, vinyltoluene, indene, methylindene, butadiene, isoprene, piperylene and pentylene as raw materials, and homopolymers or copolymers of cyclopentadiene. The petroleum resins are polymers using fractions having a carbon number of 5 to 9 as main components.

The styrene base resins include homopolymers which are low molecular weight polymers comprising styrene as a principal component, and copolymers of styrene with, for example, α-methylstyrene, vinyltoluene, and butadiene rubber.

The phenol base resins include reaction products of phenols such as phenol, cresol, xylenol, resorcinol, p-tert-butylphenol, and p-phenylphenol with aldehydes such as formaldehyde, acetaldehyde and furfural, and rosin-modified phenol resins.

A more preferred tackifier is Uni-tac® R-40 (hereinafter "R-40") available from International Paper Co., Purchase, N.Y. R-40 is a tall oil rosin, which contains a polyether segment, and is from the chemical family of abietic esters. Preferably, the tackifier is present in the composition in an amount between about 0.01 to about 10 parts per hundred, more preferred in the amount between about 0.05 to about 10 parts per hundred. A suitable alternative tackifier is the Escorez series of hydrocarbon tackifiers available from Exxon. For additional information regarding Escorez tackifiers, the specification of U.S. Pat. No. 5,643,665 is hereby incorporated by reference in its entirety. The aforementioned carriers may also be used in combination.

Preferably the adhesion promoter used in combination with the tackifier carrier is a poly(alkoxy)silane. However, the invention is not limited to only a poly(alkoxy)silane adhesion promoter in combination with a tackifier carrier. A preferred poly(alkoxy)silane adhesion promoter is bis(trimethoxysilylethyl)benzene. It is also preferred that the poly(alkoxy)silane adhesion promoter is present in the composition in an amount between 0.1 to 15 pph.

Although the adhesion promoter can be any adhesion promoter that includes a compound with a reactive silane, preferably it is an adhesion promoter as described above (i.e., including a compound containing a cyclic structure interposed between at least two reactive silanes, which are independently alkoxysilanes or halosilanes). Other suitable adhesion promoters are described in U.S. Pat. Nos. 4,921,880 and 5,188,864 to Lee et al., the specifications of which are hereby incorporated by reference. Other useful adhesion promoters will be apparent to one skilled in the art.

Preferably the coating formulation has viscosity of less than about 50 poises at about 35° C., more preferably less about 40 poises at about 35° C. and a viscosity of no more than about 30 poises at a temperature of about 50-60° C., more preferably no more than about 20 poises at a temperature of about 50-60° C., and most preferably no more than about 15 poises at a temperature of about 50-60° C.

Reference is made to U.S. patent application Ser. No. 09/476,151, filed Dec. 30, 1999, the specification of which is incorporated herein by reference as though fully set forth in its entirety, for a more detailed explanation of the adhesion promoter.

Preferably, primary coating 16 is a soft cushioning layer which preferably has a Young's modulus of less than about 5 MPa. It is also preferred that primary coating 16 is at least about 5 μm thick, more preferably at least about 25 μm, most preferably at least about 30 μm.

Exemplary embodiments of a primary coating which includes a strength additive are listed in tables A-S.

TABLE A

| Component | Compound | Wt % or pph | |
|---|---|---|---|
| Oligomer | BR3731 (polyether acrylate) | 52% | |
| Monomer | Photomer 4003 (ethoxylatednonylphenol acrylate) | 45% | |
| Photoinitiator | Irgacure 184 | 1.5% | |
| Photoinitiator | Irgacure 819 | 1.5% | |
| Adhesion Promoter | Bis(trimethoxysilylethyl)benzene | 2 | pph |
| Carrier | Tegorad2200 | 0.5 | pph |
| Antioxidant | Irganox1035 | 1 | pph |
| Strength Additive | Pentaerythritol tetrakis(3-mercaptopropionate) | 0.3 | pph |

TABLE B

| Component | Compound | Wt % or pph | |
|---|---|---|---|
| Oligomer | BR3731 (polyether acrylate) | 52% | |
| Monomer | Photomer 4003 (ethoxylatednonylphenol acrylate) | 45% | |
| Photoinitiator | Irgacure 184 | 1.5% | |
| Photoinitiator | Irgacure 819 | 1.5% | |
| Adhesion Promoter | Bis(trimethoxysilylethyl)benzene | 2 | pph |
| Carrier | Tegorad2200 | 0.5 | pph |
| Antioxidant | Irganox1035 | 1 | pph |
| Strength Additive | Pentaerythritol tetrakis(3-mercaptopropionate) | 0.7 | pph |

TABLE C

| Component | Compound | Wt % or pph | |
|---|---|---|---|
| Oligomer | BR3731 (polyether acrylate) | 52% | |
| Monomer | Photomer 4003 (ethoxylatednonylphenol acrylate) | 45% | |
| Photoinitiator | Irgacure 184 | 1.5% | |
| Photoinitiator | Irgacure 819 | 1.5% | |
| Adhesion Promoter | Bis(trimethoxysilylethyl)benzene | 2 | pph |
| Antioxidant | Irganox1035 | 1 | pph |
| Strength Additive | Chloro-propyltrimethoxy silane | 0.3 | pph |

TABLE D

| Component | Compound | Wt % or pph | |
|---|---|---|---|
| Oligomer | BR3731 (polyether acrylate) | 52% | |
| Monomer | Photomer 4003 (ethoxylatednonylphenol acrylate) | 45% | |
| Photoinitiator | Irgacure 184 | 1.5% | |
| Photoinitiator | Irgacure 819 | 1.5% | |
| Adhesion Promoter | Bis(trimethoxysilylethyl)benzene | 2 | pph |
| Antioxidant | Irganox1035 | 1 | pph |
| Strength Additive | 3-mercaptopropyltrimethoxysilane | 0.3 | pph |

TABLE E

| Component | Compound | Wt % or pph | |
|---|---|---|---|
| Oligomer | BR3731 (polyether acrylate) | 52% | |
| Monomer | Photomer 4003 (ethoxylatednonylphenol acrylate) | 45% | |
| Photoinitiator | Irgacure 184 | 1.5% | |
| Photoinitiator | Irgacure 819 | 1.5% | |
| Adhesion Promoter | Bis(trimethoxysilylethyl)benzene | 2 | pph |
| Antioxidant | Irganox1035 | 1 | pph |
| Strength Additive | Chloro-propyltrimethoxy silane | 0.5 | pph |

TABLE F

| Component | Compound | Wt % or pph | |
|---|---|---|---|
| Oligomer | BR3731 (polyether acrylate) | 52% | |
| Monomer | Photomer 4003 (ethoxylatednonylphenol acrylate) | 45% | |
| Photoinitiator | Irgacure 184 | 1.5% | |
| Photoinitiator | Irgacure 819 | 1.5% | |
| Adhesion Promoter | Bis(trimethoxysilylethyl)benzene | 2 | pph |
| Antioxidant | Irganox1035 | 1 | pph |
| Strength Additive | Chloro-propyltrimethoxy silane | 1.0 | pph |

TABLE G

| Component | Compound | Wt % or pph | |
|---|---|---|---|
| Oligomer | BR3731 (polyether acrylate) | 52% | |
| Monomer | Photomer 4003 (ethoxylatednonylphenol acrylate) | 45% | |
| Photoinitiator | Irgacure 184 | 1.5% | |
| Photoinitiator | Irgacure 819 | 1.5% | |
| Adhesion Promoter | Bis(trimethoxysilylethyl)benzene | 2 | pph |
| Carrier | Tegorad2200 | 0.5 | pph |
| Antioxidant | Irganox1035 | 1 | pph |
| Strength Additive | Chloro-octane | 0.3 | pph |

TABLE H

| Component | Compound | Wt % or pph | |
|---|---|---|---|
| Oligomer | BR3731 (polyether acrylate) | 52% | |
| Monomer | Photomer 4003 (ethoxylatednonyl-phenol acrylate) | 45% | |
| Photoinitiator | Irgacure 184 | 1.5% | |
| Photoinitiator | Irgacure 819 | 1.5% | |
| Adhesion Promoter | Bis(trimethoxysilylethyl)benzene | 2 | pph |
| Carrier | Tegorad2200 | 0.5 | pph |
| Antioxidant | Irganox1035 | 1 | pph |
| Strength Additive | Chloro-octane | 0.5 | pph |

TABLE I

| Component | Compound | Wt % or pph | |
|---|---|---|---|
| Oligomer | BR3731 (polyether acrylate) | 52% | |
| Monomer | Photomer 4003 (ethoxylatednonyl-phenol acrylate) | 45% | |
| Photoinitiator | Irgacure 184 | 1.5% | |
| Photoinitiator | Irgacure 819 | 1.5% | |
| Adhesion Promoter | Bis(trimethoxysilylethyl)benzene | 2 | pph |
| Carrier | Tegorad2200 | 0.5 | pph |
| Antioxidant | Irganox1035 | 1 | pph |
| Strength Additive | Chloro-octane | 1.0 | pph |

TABLE J

| Component | Compound | Wt % or pph | |
|---|---|---|---|
| Oligomer | BR3731 (polyether acrylate) | 52% | |
| Monomer | Photomer 4003 (ethoxylatednonyl-phenol acrylate) | 45% | |
| Photoinitiator | Irgacure 184 | 1.5% | |
| Photoinitiator | Irgacure 819 | 1.5% | |
| Adhesion Promoter | Methacryloxypropyltrimethoxysilane | 1 | pph |
| Antioxidant | Irganox1035 | 1 | pph |
| Strength Additive | 3-mercaptopropyltrimethoxysilane | 0.3 | pph |

TABLE K

| Component | Compound | Wt % or pph | |
|---|---|---|---|
| Oligomer | BR3731 (polyether acrylate) | 52% | |
| Monomer | Photomer 4003 (ethoxylatednonyl-phenol acrylate) | 45% | |
| Photoinitiator | Irgacure 184 | 1.5% | |
| Photoinitiator | Irgacure 819 | 1.5% | |
| Adhesion Promoter | Methacryloxypropyltrimethoxysilane | 1 | pph |
| Antioxidant | Irganox1035 | 1 | pph |
| Strength Additive | Pentaerythritol tetrakis(3-mercaptopropionate) | 0.3 | pph |

TABLE L

| Component | Compound | Wt % or pph | |
|---|---|---|---|
| Oligomer | BR3731 (polyether acrylate) | 52% | |
| Monomer | Photomer 4003 (ethoxylatednonyl-phenol acrylate) | 45% | |
| Photoinitiator | Irgacure 184 | 1.5% | |
| Photoinitiator | Irgacure 819 | 1.5% | |
| Adhesion Promoter | Methacryloxypropyltrimethoxysilane | 1 | pph |
| Antioxidant | Irganox1035 | 1 | pph |
| Strength Additive | Pentaerythritol tetrakis(3-mercaptopropionate) | 0.5 | pph |

TABLE M

| Component | Compound | Wt % or pph | |
|---|---|---|---|
| Oligomer | BR3731 (polyether acrylate) | 52% | |
| Monomer | Photomer 4003 (ethoxylatednonyl-phenol acrylate) | 45% | |
| Photoinitiator | Irgacure 184 | 1.5% | |
| Photoinitiator | Irgacure 819 | 1.5% | |
| Adhesion Promoter | Methacryloxypropyltrimethoxysilane | 1 | pph |
| Antioxidant | Irganox1035 | 1 | pph |
| Strength Additive | Pentaerythritol tetrakis(3-mercaptopropionate) | 0.7 | pph |

TABLE N

| Component | Compound | Wt % or pph | |
|---|---|---|---|
| Oligomer | BR3731 (polyether acrylate) | 52% | |
| Monomer | Photomer 4003 (ethoxylatednonyl-phenol acrylate) | 45% | |
| Photoinitiator | Irgacure 184 | 1.5% | |
| Photoinitiator | Irgacure 819 | 1.5% | |
| Adhesion Promoter | Methacryloxypropyltrimethoxysilane | 1 | pph |
| Antioxidant | Irganox1035 | 1 | pph |
| Strength Additive | Chloro-propyltrimethoxy silane | 0.3 | pph |

TABLE O

| Component | Compound | Wt % or pph | |
|---|---|---|---|
| Oligomer | BR3731 (polyether acrylate) | 52% | |
| Monomer | Photomer 4003 (ethoxylatednonyl-phenol acrylate) | 45% | |
| Photoinitiator | Irgacure 184 | 1.5% | |
| Photoinitiator | Irgacure 819 | 1.5% | |
| Adhesion Promoter | Methacryloxypropyltrimethoxysilane | 1 | pph |
| Antioxidant | Irganox1035 | 1 | pph |
| Strength Additive | Chloro-propyltrimethoxy silane | 0.5 | pph |

TABLE P

| Component | Compound | Wt % or pph | |
|---|---|---|---|
| Oligomer | BR3731 (polyether acrylate) | 52% | |
| Monomer | Photomer 4003 (ethoxylatednonyl-phenol acrylate) | 45% | |
| Photoinitiator | Irgacure 184 | 1.5% | |
| Photoinitiator | Irgacure 819 | 1.5% | |
| Adhesion Promoter | Methacryloxypropyltrimethoxysilane | 1 | pph |
| Antioxidant | Irganox1035 | 1 | pph |
| Strength Additive | Chloro-propyltrimethoxy silane | 1.0 | pph |

TABLE Q

| Component | Compound | Wt % or pph | |
|---|---|---|---|
| Oligomer | BR3731 (polyether acrylate) | 52% | |
| Monomer | Photomer 4003 (ethoxylatednonyl-phenol acrylate) | 45% | |
| Photoinitiator | Irgacure 184 | 1.5% | |
| Photoinitiator | Irgacure 819 | 1.5% | |
| Adhesion Promoter | Methacryloxypropyltrimethoxysilane | 1 | pph |
| Antioxidant | Irganox1035 | 1 | pph |
| Strength Additive | Chloro-octane | 0.3 | pph |

TABLE R

| Component | Compound | Wt % or pph |
|---|---|---|
| Oligomer | BR3731 (polyether acrylate) | 52% |
| Monomer | Photomer 4003 (ethoxylatednonylphenol acrylate) | 45% |
| Photoinitiator | Irgacure 184 | 1.5% |
| Photoinitiator | Irgacure 819 | 1.5% |
| Adhesion Promoter | Methacryloxypropyltrimethoxysilane | 1 pph |
| Antioxidant | Irganox1035 | 1 pph |
| Strength Additive | Chloro-octane | 0.5 pph |

TABLE S

| Component | Compound | Wt % or pph |
|---|---|---|
| Oligomer | BR3731 (polyether acrylate) | 52% |
| Monomer | Photomer 4003 (ethoxylatednonylphenol acrylate) | 45% |
| Photoinitiator | Irgacure 184 | 1.5% |
| Photoinitiator | Irgacure 819 | 1.5% |
| Adhesion Promoter | Methacryloxypropyltrimethoxysilane | 1 pph |
| Antioxidant | Irganox1035 | 1 pph |
| Strength Additive | Chloro-octane | 1.0 pph |

Secondary coating material 18 is typically the polymerization (i.e., cured) product of a coating composition that contains urethane acrylate liquids whose molecules become cross-linked when polymerized. Other suitable materials for use in secondary coating materials, as well as considerations related to selection of these materials, are well known in the art and are described in U.S. Pat. Nos. 4,962,992 and 5,104,433 to Chapin, the specifications of which are hereby incorporated by reference. Various additives that enhance one or more properties of the coating can also be present, including the above-mentioned additives incorporated in the compositions of the present invention.

Typical secondary coatings will include at least one UV curable monomer and at least one photoinitiator. The secondary coating may also include about 0-90 weight percent of at least one UV curable oligomer. It is preferred that the secondary coating is not a thermoplastic resin. Preferably, both the monomer and the oligomer are compounds capable of participating in addition polymerization. The monomer or the oligomer may be the major component of the secondary coating. An example of a suitable monomer is an ethylenically unsaturated monomer. Ethylenically unsaturated monomers may contain various functional groups, which enable their cross-linking. The ethylenically unsaturated monomers are preferably polyfunctional (i.e., each containing two or more functional groups), although monofunctional monomers can also be introduced into the composition. Therefore, the ethylenically unsaturated monomer can be a polyfunctional monomer, a monofunctional monomer, and mixtures thereof. Suitable functional groups for ethylenically unsaturated monomers used in accordance with the present invention include, without limitation, acrylates, methacrylates, acrylamides, N-vinyl amides, styrenes, vinyl ethers, vinyl esters, acid esters, and combinations thereof (i.e., for polyfunctional monomers).

In general, individual monomers capable of about 80% or more conversion (i.e., when cured) are more desirable than those having lower conversion rates. The degree to which monomers having lower conversion rates can be introduced into the composition depends upon the particular requirements (i.e., strength) of the resulting cured product. Typically, higher conversion rates will yield stronger cured products.

Suitable polyfunctional ethylenically unsaturated monomers include, without limitation, alkoxylated bisphenol A diacrylates such as ethoxylated bisphenol A diacrylate with ethoxylation being 2 or greater, preferably ranging from 2 to about 30 (e.g. SR349 and SR601 available from Sartomer Company, Inc. West Chester, Pa. and Photomer 4025 and Photomer 4028, available from Cognis Corp. (Ambler, Pa.)), and propoxylated bisphenol A diacrylate with propoxylation being 2 or greater, preferably ranging from 2 to about 30; methylolpropane polyacrylates with and without alkoxylation such as ethoxylated trimethylolpropane triacrylate with ethoxylation being 3 or greater, preferably ranging from 3 to about 30 (e.g., Photomer 4149, Cognis Corp., and SR499, Sartomer Company, Inc.), propoxylated trimethylolpropane triacrylate with propoxylation being 3 or greater, preferably ranging from 3 to 30 (e.g., Photomer 4072, Cognis Corp. and SR492, Sartomer), and ditrimethylolpropane tetraacrylate (e.g., Photomer 4355, Cognis Corp.); alkoxylated glyceryl triacrylates such as propoxylated glyceryl triacrylate with propoxylation being 3 or greater (e.g., Photomer 4096, Cognis Corp. and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, Cognis Corp., and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with ethoxylation being 2 or greater, preferably ranging from about 2 to 30; epoxy acrylates formed by adding acrylate to bisphenol A diglycidylether (4 up) and the like. (e.g., Photomer 3016, Cognis Corp.); and single and multi-ring cyclic aromatic or non-aromatic polyacrylates such as dicyclopentadiene diacrylate and dicyclopentane diacrylate.

It may also be desirable to use certain amounts of monofunctional ethylenically unsaturated monomers, which can be introduced to influence the degree to which the cured product absorbs water, adheres to other coating materials, or behaves under stress. Exemplary monofunctional ethylenically unsaturated monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR423, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated (4) nonylphenol acrylate (e.g., Photomer 4003, Cognis Corp.); acrylamides such as diacetone acrylamide, isobutoxymethyl acrylamide, N,N'-dimethyl-aminopropyl acrylamide, N,N-dimethyl acrylamide, N,N-diethyl acrylamide, and t-octyl acrylamide; vinylic compounds such as N-vinylpyrrolidone and N-vinylcaprolactam; and acid esters such as maleic acid ester and fumaric acid ester.

Most suitable monomers are either commercially available or readily synthesized using reaction schemes known in the art. For example, most of the above-listed monofunctional monomers can be synthesized by reacting an appropriate alcohol or amine with an acrylic acid or acryloyl chloride.

As indicated above, an optional constituent of the secondary coating composition is the oligomeric component. The oligomeric component can include a single type of oligomer or it can be a combination of two or more oligomers. When employed, if at all, the oligomeric component introduced into the compositions of the present invention preferably comprises ethylenically unsaturated oligomers When employed, suitable oligomers can be either monofunctional oligomers or polyfunctional oligomers, although polyfunctional oligomers are preferred. The oligomeric component can also be a combination of a monofunctional oligomer and a polyfunctional oligomer.

Di-functional oligomers preferably have a structure according to formula (I) below:

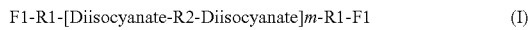

F1-R1-[Diisocyanate-R2-Diisocyanate]$m$-R1-F1  (I)

where F1 is independently a reactive functional group such as acrylate, methacrylate, acrylamide, N-vinyl amide, styrene, vinyl ether, vinyl ester, or other functional group known in the art; R1 includes independently —C2-12O—, —(C2-4-O)n-, —C2-12O—(C2-4-O)n-, —C2-12O—(CO—C2-5O)n-, or —C2-12O—(CO—C2-5NH)n- where n is a whole number from 1 to 30, preferably 1 to 10; R2 is polyether, polyester, polycarbonate, polyamide, polyurethane, polyurea, or combinations thereof; and m is a whole number from 1 to 10, preferably 1 to 5. In the structure of formula I, the diisocyanate group is the reaction product formed following bonding of a diisocyanate to R2 and/or R1.

Other polyfunctional oligomers preferably have a structure according to formula (II) or formula (III) as set forth below:

multiisocyanate-(R2-R1-F2)$x$  (II)

or

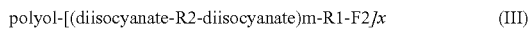

polyol-[(diisocyanate-R2-diisocyanate)m-R1-F2]$x$  (III)

where F2 independently represents from 1 to 3 functional groups such as acrylate, methacrylate, acrylamide, N-vinyl amide, styrene, vinyl ether, vinyl ester, or other functional groups known in the art; R1 can include —C2-12O—, —(C2-4-O)n-, —C2-12O—(C2-4-O)n-, —C2-12O—(CO—C2-5O)n-, or —C2-12O—(CO—C2-5NH)n- where n is a whole number from 1 to 10, preferably 1 to 5; R2 can be polyether, polyester, polycarbonate, polyamide, polyurethane, polyurea or combinations thereof; x is a whole number from 1 to 10, preferably 2 to 5; and m is a whole number from 1 to 10, preferably 1 to 5. In the structure of formula II, the multiisocyanate group is the reaction product formed following bonding of a multiisocyanate to R2. Similarly, the diisocyanate group in the structure of formula III is the reaction product formed following bonding of a diisocyanate to R2 and/or R1.

Urethane oligomers are conventionally provided by reacting an aliphatic diisocyanate with a dihydric polyether or polyester, most typically a polyoxyalkylene glycol such as a polyethylene glycol. Such oligomers typically have between about four to about ten urethane groups and may be of high molecular weight, e.g., 2000-8000. High molecular weight oligomers, with molecular weights as high as 15000, may also be used. However, lower molecular weight oligomers, having molecular weights in the 500-2000 range, may also be used. U.S. Pat. No. 4,608,409 to Coady et al. and U.S. Pat. No. 4,609,718 to Bishop et al., the specifications of which are hereby incorporated by reference to describe such syntheses in detail.

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from about 2-250 carbon atoms and, preferably, are substantially free of ether or ester groups.

Polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently nonpolar and saturated as to avoid compromising the moisture resistance of the system.

A non-exhaustive list of suitable oligomers include BR301, which is an aromatic urethane acrylate oligomer available from Bomar Specialty Co., Photomer 6010, which is an aliphatic urethane acrylate oligomer available from Henkel Corp., KWS5021, which is an aliphatic urethane acrylate oligomer available from Bomar Specialty Co., RCC12-892, which is a multi-functional aliphatic urethane acrylate oligomer available from Henkel Corp., RCC13-572, which is an aromatic urethane diacrylate oligomer available from Henkel Corp., and KWS4131, which is an aliphatic urethane acrylate oligomer available from Bomar Specialty Co.

Optical fiber secondary coating compositions may also contain a polymerization initiator which is suitable to cause polymerization (i.e., curing) of the composition after its application to a glass fiber or previously coated glass fiber. Polymerization initiators suitable for use in the compositions of the present invention include thermal initiators, chemical initiators, electron beam initiators, microwave initiators, actinic-radiation initiators, and photoinitiators. Particularly preferred are the photoinitiators. For most acrylate-based coating formulations, conventional photoinitiators, such as the known ketonic photoinitiating and/or phosphine oxide additives, are preferred. When used in the compositions of the present invention, the photoinitiator is present in an amount sufficient to provide rapid ultraviolet curing. Generally, this includes about 0.5 to about 10.0 weight percent, more preferably about 1.5 to about 7.5 weight percent.

The photoinitiator, when used in a small but effective amount to promote radiation cure, must provide reasonable cure speed without causing premature gelation of the coating composition. A desirable cure speed is any speed sufficient to cause substantial curing (i.e., greater than about 90%, more preferably 95%) of the coating composition. As measured in a dose versus modulus curve, a cure speed for coating thickness' of about 25-35 μm is, e.g., less than 1.0 J/cm2, preferably less than 0.5 J/cm2. It is preferred that the secondary coating composition contains about 10-90% of the monomer; of about 0-90% of the oligomer; and about 0.5-10% of the photoinitiator.

Suitable photoinitiators include, without limitation, 1-hydroxycyclohexylphenyl ketone (e.g., Irgacure 184 available from Ciba Specialty Chemical (Tarrytown, N.Y.)), (2,6-dimethoxybenzoyl)-2,4,4-trimethylpentyl phosphine oxide (e.g., in commercial blends Irgacure 1800, 1850, and 1700, Ciba Specialty Chemical), 2,2-dimethoxyl-2-phenyl acetophenone (e.g., Irgacure 651, Ciba Specialty Chemical), bis(2,4,6-trimethylbenzoyl)phenyl phosphine oxide (e.g., Irgacure 819, Ciba Specialty Chemical), (2,4,6-trimethylbenzoyl)diphenyl phosphine oxide (e.g., in commercial blend Darocur 4265, Ciba Specialty Chemical), 2-hydroxy-2-methyl-1-phenylpropane-1-one (e.g., in commercial blend Darocur 4265, Ciba Specialty Chemical), (2,4,6-trimethylbenzoyl)diphenyl phosphine oxide (Lucerin TPO, available from BASF (Munich, Germany)), ethoxy (2,4,6-trimethylbenzoyl)phenyl phosphine oxide (Lucerin TPO-L from BASF), and combinations thereof. Other photoinitiators are continually being developed and used in coating compositions on glass fibers. Any suitable photoinitiator can be introduced into compositions of the present invention.

In addition to the above-described components, the secondary coating composition of the present invention can optionally include an additive or a combination of additives. Suitable additives include, without limitation, antioxidants, catalysts, lubricants, low molecular weight non-crosslinking resins, adhesion promoters, and stabilizers. Some additives can operate to control the polymerization process, thereby affecting the physical properties (e.g., modulus, glass transition temperature) of the polymerization product formed from the composition. Others can affect the integrity of the polymerization product of the composition (e.g., protect against de-polymerization or oxidative degradation).

A preferred antioxidant is thiodiethylene bis[(3,5-di-tert-butyl-4-hydroxy) hydrocinnamate] (e.g., Irganox 1035, available from Ciba Specialty Chemical).

Other suitable materials for use in secondary coating materials, as well as considerations related to selection of these materials are described in U.S. Pat. Nos. 4,962,992 and 5,104,433 to Chapin, which are hereby incorporated by reference. Various additives that enhance one or more properties of the coating can also be present, including the above-mentioned additives incorporated in the compositions of the present invention.

Reference is made to U.S. Patent Application No. 60/173,874, filed Dec. 30, 1999, and Provisional U.S. Patent Application filed Jul. 26, 2000 by Botelho et al., titled Secondary Coating Compositions for Optical Fibers, the specifications of which are incorporated herein by reference as though fully set forth in its entirety, for a more detailed explanation of secondary coatings.

Preferably, secondary coating 18 has a Young's modulus of at least about 50 MPa, more preferably at least about 500 MPa, and most preferably at least about 1000 MPa. In one embodiment of fiber 10, the outer diameter of secondary coating 18 is about 245 μm. It is preferred that the secondary coating is at least 5 μm thick, more preferably at least about 20 μm, and most preferably at least about 25 μm.

Secondary coating 18 can be a tight buffer coating or, alternatively, a loose tube coating. Irrespective of the type of secondary coating employed, it is preferred that the outer surface of secondary coating 18 is not tacky so that adjacent convolutions of the optic fiber (i.e., on a process spool) can be unwound.

The optical fibers of the present invention can also be formed into an optical fiber ribbon which contains a plurality of substantially aligned, substantially coplanar optic fibers encapsulated by a matrix material. The matrix material can be made of a single layer or of a composite construction. Suitable matrix materials include polyvinyl chloride or other thermoplastic materials as well as those materials known to be useful as secondary coating materials. In one embodiment, the matrix material can be the polymerization product of the composition used to form the secondary coating material.

Briefly, the process for making a coated optical fiber in accordance with the invention involves fabricating glass fiber 10 (core 12 and cladding layer 14), coating the glass fiber with the primary coating composition of the present invention, and polymerizing the composition to form the primary coating material 16. Optionally, secondary coating composition 18 can be applied to the coated fiber either before or after polymerizing the primary coating. When applied after polymerizing the primary coating, a second polymerization step must be employed. The primary and optional secondary coating compositions are coated on a glass fiber using conventional processes.

It is well known to draw glass fibers from a specially prepared, cylindrical preform which has been locally and symmetrically heated to a temperature, e.g., of about 2000° C. As the preform is heated, such as by feeding the preform into and through a furnace, a glass fiber is drawn from the molten material. The primary coating and secondary coating compositions are applied to the glass fiber after it has been drawn from the preform, preferably immediately after cooling. The coating compositions are then cured to produce the coated optical fiber. The method of curing can be thermal, chemical, or radiation induced, such as by exposing the un-cured coating composition on the glass fiber to heat or ultraviolet light or electron beam, depending upon the nature of the coating composition(s) and polymerization initiator being employed. It is frequently advantageous to apply both the primary coating composition and any secondary coating compositions in sequence following the draw process. One method of applying dual layers of coating compositions to a moving glass fiber is disclosed in U.S. Pat. No. 4,474,830 to Taylor, the specification of which is hereby incorporated by reference. Another method for applying dual layers of coating compositions onto a glass fiber is disclosed in U.S. Pat. No. 4,581,165 to Rannell et al. the specification of which is hereby incorporated by reference. Of course, the primary coating composition can be applied and cured to form the primary coating material 16, then the secondary coating composition(s) can be applied and cured to form the secondary coating material 18.

Figure 2:
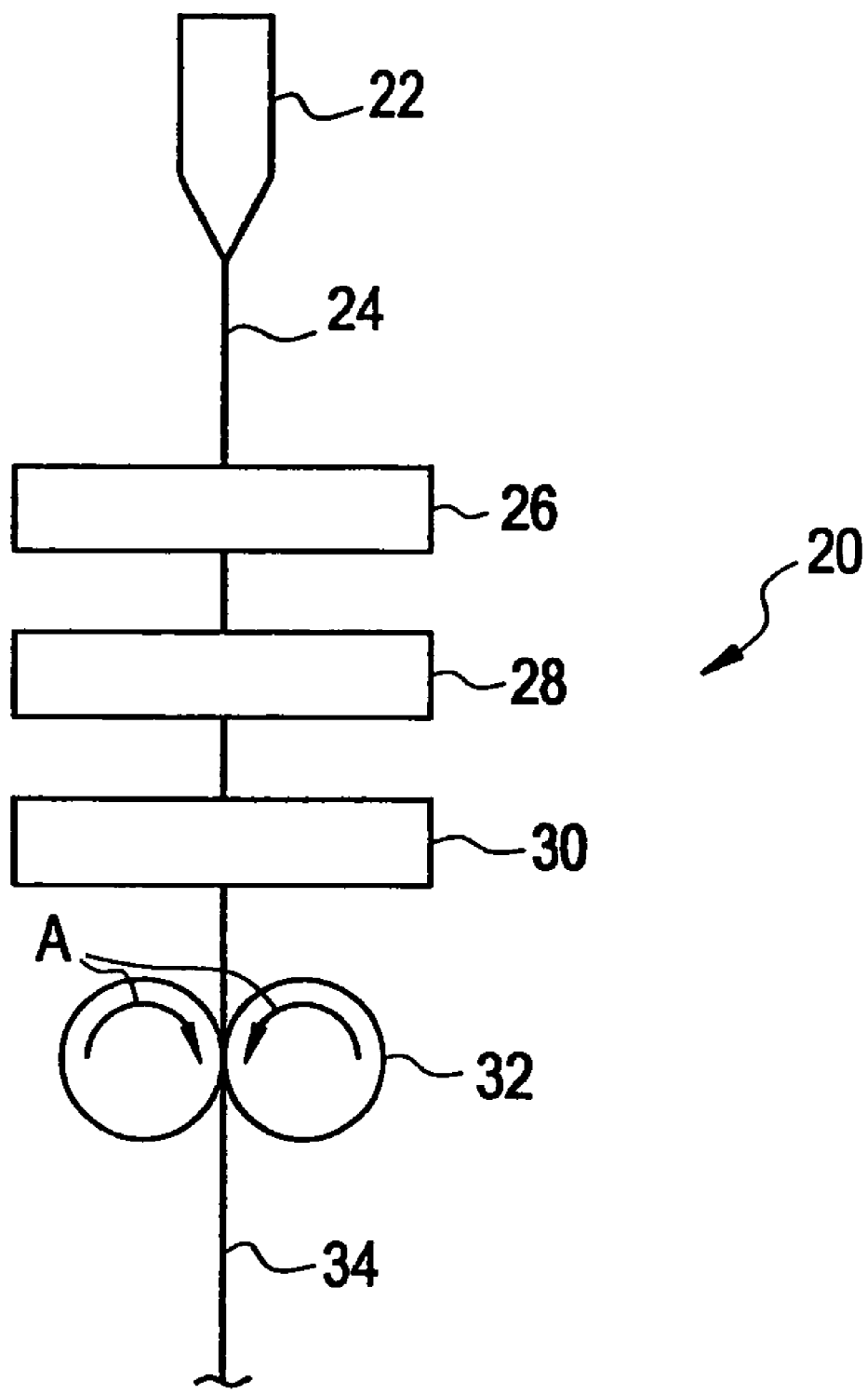
FIG. 2 is a partial schematic cross sectional view of the process of drawing and coating an optical fiber in accordance with the invention.

One embodiment of a process for manufacturing a coated optical fiber in accordance with the invention is further described in FIG. 2, generally denoted as 20. As shown in FIG. 2, a sintered preform 22 (shown as a partial preform) is drawn into an optical fiber 24. The fiber 24 passes through coating elements 26 and 28. Preferably, coating 16 is applied to fiber 24 in element 26 and coating 18 is applied to fiber 24 in element 28. Curing element 30 is located downstream from elements 26 and 28 to cure the coatings applied to fiber 24. Alternatively, the coating applied in element 26 may be cured prior to fiber 24 passing through element 28. Tractors 32 are used to pull a coated optical fiber 34 through element 30. The tractors rotate in the direction of arrows A.

It is preferred that inventive coating is at least about 5 μm thick, more preferred at least about 20 μm, most preferred at least about 25 μm thick. Specific embodiments of primary coating 16 may be about 30 μm thick or more. Specific embodiments of secondary coating 18 may also be at least about 25 μm thick.

EXAMPLES

The invention will be further clarified by the following examples which are intended to be exemplary of the invention.

Example 1

Coating Compositions

A number of compositions of the present invention were prepared with the components listed in Table 1-1 below using commercial blending equipment. The oligomer and monomer components were weighed and then introduced into a heated kettle and blended together at a temperature within the range of from about 50° C. to 80° C. Blending was continued until a homogenous mixture was obtained. Next, the photoinitiator and antioxidant were individually weighed and separately introduced into the homogeneous solution while blending. Additives such as the strength additive an adhesion promoter, and optional carrier were weighed and then introduced into the solution while blending. Blending was continued until a homogeneous solution was again obtained.

TABLE 1-1

Coating Compositions

| Fiber and Coating Composition Code | Primary Coating (wt % or pph) | Secondary Coating (wt % or pph) |
|---|---|---|
| A | BR 3731 (52%) <br> Photomer 4003 (45%) <br> Irgacure 1850 (3%) <br> Irganox 1035 (1 pph) <br> Bis(trimethoxysilylethyl)benzene (1 pph) <br> Tegorad 2200 (0.5 pph) <br> 3 Mercaptopropyl-trimethoxysilane (0.3 pph) | BR301 (10%) <br> Photomer4025 (22%) <br> Photomer 4028 (65%) <br> Irgacure 1850 (3%) <br> Irganox 1035 (0.5 pph) |
| B | BR 3731 (52%) <br> Photomer 4003 (45%) <br> Irgacure 1850 (3%) <br> Irganox 1035 (1 pph) <br> Bis(trimethoxysilylethyl)benzene (2 pph) <br> 3 Mercaptopropyl-trimethoxysilane (0.3 pph) | KWS 4131 (10%) <br> Photomer 4028 (87%) <br> Irgacure 1850 (3%) <br> Irganox 1035 (0.5 pph) |
| C | BR 3731 (52%) <br> Photomer 4003 (45%) <br> Irgacure 1850 (3%) <br> Irganox 1035 (1 pph) <br> Bis(trimethoxysilylethyl)benzene (2 pph) <br> 3 Mercaptopropyl-trimethoxysilane (0.1 pph) | KWS 4131 (10%) <br> Photomer 4028 (87%) <br> Irgacure 1850 (3%) <br> Irganox 1035 (0.5 pph) |
| D | BR 3731 (52%) <br> Photomer 4003 (45%) <br> Irgacure 1850 (3%) <br> Irganox 1035 (1 pph) <br> Bis(trimethoxysilylethyl)benzene (2 pph) <br> Unitac R40 (1 pph) <br> 3 Mercaptopropyl-trimethoxysilane (0.3 pph) | KWS 4131 (10%) <br> Photomer 4028 (87%) <br> Irgacure 1850 (3%) <br> Irganox 1035 (0.5 pph) |
| E | BR 3731 (52%) <br> Photomer 4003 (45%) <br> Irgacure 1850 (3%) <br> Irganox 1035 (1 pph) <br> Bis(trimethoxysilylethyl)benzene (2 pph) <br> Unitac R40 (1 pph) <br> 3 Mercaptopropyl-trimethoxysilane (0.1 pph) | KWS 4131 (10%) <br> Photomer 4028 (87%) <br> Irgacure 1850 (3%) <br> Irganox 1035 (0.5 pph) |
| F | BR 3731 (52%) <br> Photomer 4003 (45%) <br> Irgacure 1850 (3%) <br> Irganox 1035 (1 pph) <br> Bis(trimethoxysilylethyl)benzene (2 pph) <br> Tegorad 2200 (0.5 pph) <br> Tert-dodecylmercaptan (0.3 pph) | BR301 (10%) <br> Photomer 4025 (22%) <br> Photomer 4028 (65%) <br> Irgacure 1850 (3%) <br> Irganox 1035 (0.5 pph) |
| G | BR 3731 (52%) <br> Photomer 4003 (45%) <br> Irgacure 1850 (3%) <br> Irganox 1035 (1 pph) <br> 3 Mercaptopropyl-trimethoxysilane (0.3 pph) | BR301 (10%) <br> Photomer 4025 (22%) <br> Photomer 4028 (65%) <br> Irgacure 1850 (3%) <br> Irganox 1035 (0.5 pph) <br> Ebecryl 170 (0.2 pph) |

The test coatings were applied to SMF-28 fiber, available from Corning, Incorporated of Corning, N.Y. The length of each sample of coated fiber was about 20 to about 200 km. Each of the coated fibers were tested for fiber strength, Young's modulus, tensile strength, percent elongation, average cure speed, dry and wet strip force pullout, and water soak.

Example 2

Fiber Strength

The fiber strength of fibers coated with coatings A-G were tested in accordance with FOTP 28C. Fiber samples were tested under the conditions of "as received" (meaning the coated fiber samples tested were not aged in an environmental chamber) and after coated fiber samples were aged in an environmental chamber for 30 days at 85° C. and 85% Rh. The strength performance of these fibers is listed below in Table 2-1. All fibers showed good strength performance after aging—i.e. the 50% failure stress after aging for each fiber was >710 kpsi. Fibers A, B, D, and E showed no significant strength loss after aging. Fibers C and F showed very small degradation in fiber strength (Δ50% Failure Stress 27 kpsi and 29 kpsi, respectively) post aging. Fiber G essentially showed no change in fiber strength after aging. All of the fibers exhibited sufficient strength to pass Bellcore specification GR-20-CORE.

TABLE 2-1

Fiber Strength.

| Fiber Coating | As received | | | 30 day aged | | |
|---|---|---|---|---|---|---|
| Code | 15% F.S. | 50% F.S. | W.S. | 15% F.S. | 50% F.S. | W.S. |
| A | 605 | 759 | 10 | 751 | 761 | 121 |
| B | 758 | 744 | 87 | 747 | 736 | 95 |
| C | 753 | 745 | 169 | 728 | 718 | 103 |
| D | 758 | 749 | 112 | 753 | 745 | 120 |
| E | 755 | 743 | 95 | 742 | 731 | 103 |
| F | 736 | 744 | 119 | 705 | 715 | 94 |
| G | 732 | 738 | 120 | 735 | 743 | 98 |

FS: Fiber Strength
WS: Weibull Slope

The effect of varying the adhesion promoter, the strength additive, and the amount of the strength additive was also tested. The base primary coating included 52% BR 3731, 45% Photomer 4003, 1.5% Irgacure 184, 1.5% Irgacure 819, and 1 pph Irganox 1035. The adhesion promoters and strength additives were varied as set forth below in table 2-2. Each fiber was coated with the same secondary coating. The formulation of the secondary coating was 10% KWS 4131, 82% Photomer 4028, 5% Photomer 3016, 1.5% Irgacure 184, 1.5% Irgacure 819, and 0.5 pph Irganox 1035. The amount of strength additive varied from 0 to 1.0 pph. The type of fiber tested was also SMF-28.

TABLE 2-2

| Fiber and Coating Composition Code | Adhesion Promoter (pph) | Strength Additive |
|---|---|---|
| H | Methacrylate Silane (1 pph) | Tetrathiol (pentaerythritol tetrakis (3-mercaptopropionate)) |
| I | Methacrylate Silane (1 pph) | Chlorosilane |
| J | Methacrylate Silane (1 pph) | Chloro-octane |
| K | Methacrylate Silane (1 pph) | Mercaptosilane (3-mercaptopropyltri-methoxy silane) |
| L | Bis(trimethoxysilylethyl) benzene (2 pph) * | Tetrathiol (pentaerythritol tetrakis (3-mercaptopropionate)) |
| M | Bis(trimethoxysilylethyl) benzene (2 pph) * | Chlorosilane |
| N | Bis(trimethoxysilylethyl) benzene (2 pph) * | Chloro-octane |
| O | Bis(trimethoxysilylethyl) benzene (2 pph) * | Mercaptosilane (3-mercaptopropyltri-methoxy silane) |

Figure 3:
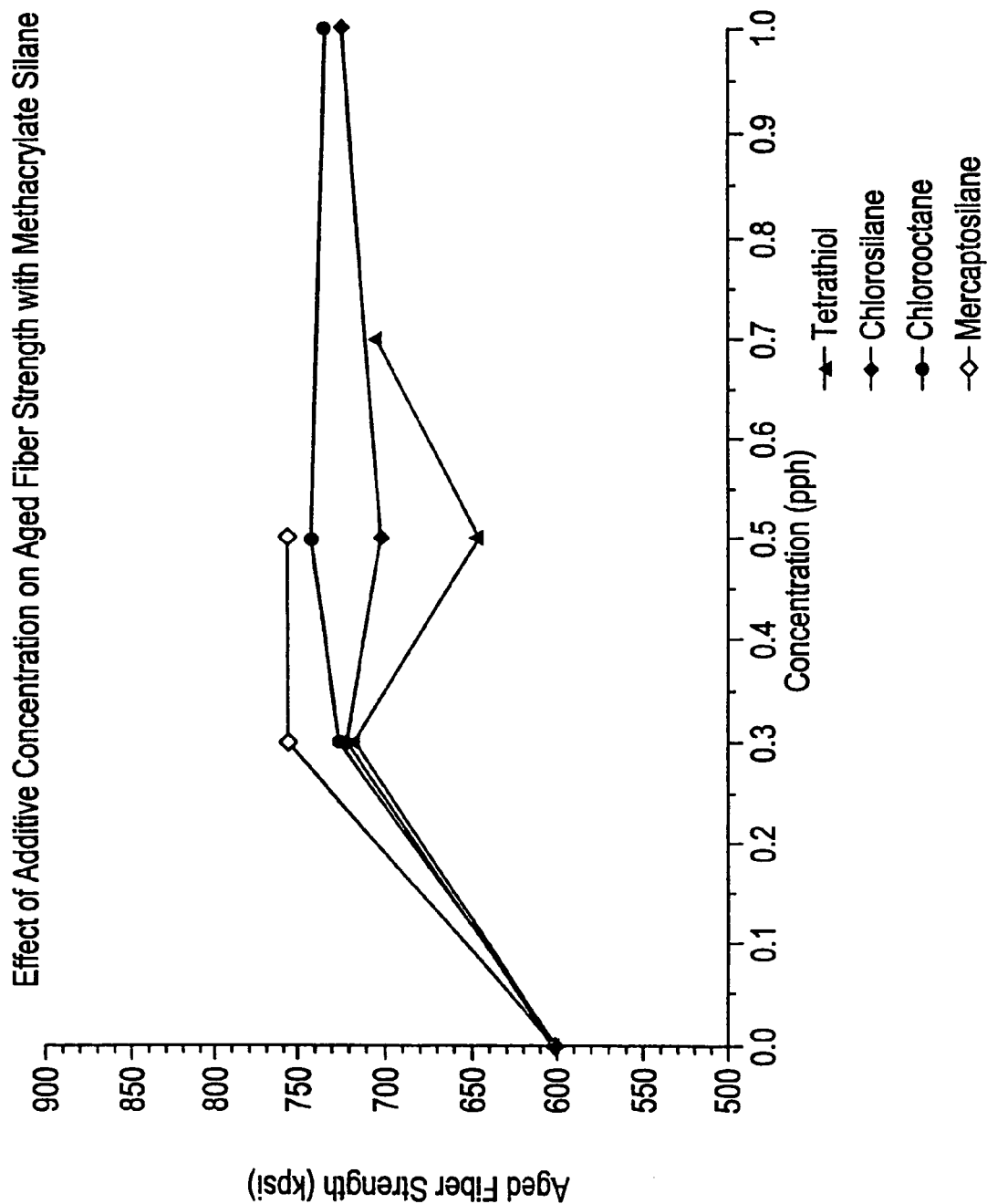
FIGS. 3 and 4 are plots of the fiber strength for aged fibers with a varying amount of strength additive in combination with a particular concentration of a particular adhesion promoter.
Figure 4:
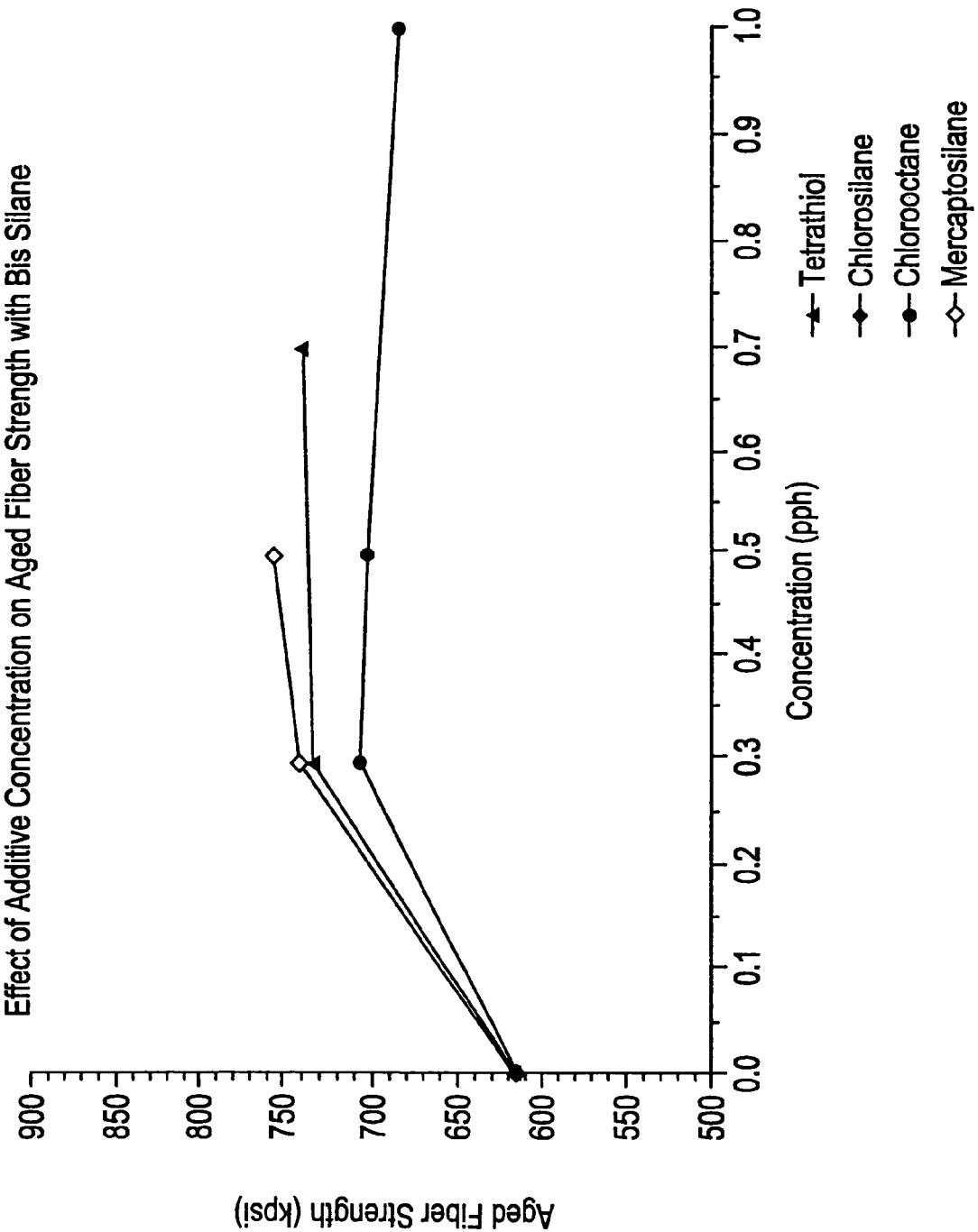

* Included 0.5 pph of Tegorad 2200
Methacrylate silane: methacryl oxypropyltrimethoxy silane
Chlorosilane: chloro-propyltrimethoxy silane The fiber strength of fibers coated with coatings H—O were tested in accordance with FOTP 28C. The fiber samples were tested after the samples were aged in an environmental chamber for 30 days at 85° C. and 85% Rh. The strength performance of each fiber is shown in FIGS. 3 and 4. With respect to fibers H—O, all fibers that included a strength additive exhibited fiber strength of at least about 700 kpsi except for two samples. The mercaptosilane strength additive consistently exhibited the highest strength for compositions which included no more than about 0.5 pph of a strength additive.

SMF-28, available from Corning Incorporated of Corning, N.Y., was coated with the compositions listed in table 2-3 and the fiber strength of each coated sample was tested "as-received" and after a sample was aged in an environmental chamber for 30 days at 85° C. and 85% Rh. The samples were tested in accordance with FOTP-28.

TABLE 2-3

| Fiber and Coating Composition Code | Primary Coating (wt % or pph) | Secondary Coating (wt % or pph) |
|---|---|---|
| P | BR 3731 (52%) Photomer 4003 (45%) Irgacure 184 (1.5%) Irgacure 819 (1.5%) Bis(trimethoxysilylethyl) benzene (2 pph) Irganox 1035 (1 pph) 3-Chloropropyltrimethoxy-silane (0.3 pph) | KWS 4131 (10%) Photomer 4028 (87%) Irgacure 1850 (3%) Irganox 1035 (0.5 pph) |
| Q | BR 3731 (52%) Photomer 4003 (45%) Irgacure 184 (1.5%) Irgacure 819 (1.5%) Bis(trimethoxysilylethyl) benzene (2 pph) Irganox 1035 (1 pph) 1-Chlorooctance (0.3 pph) | KWS 4131 (10%) Photomer 4028 (87%) Irgacure 1850 (3%) Irganox 1035 (0.5 pph) |
| Control-3 | BR 3731 (52%) Photomer 4003 (45%) Irgacure 184 (1.5%) Irgacure 819 (1.5%) Irganox 1035 (1 pph) Bis(trimethoxysilylethyl) benzene (2 pph) | KWS 4131 (10%) Photomer 4028 (87%) Irgacure 1850 (3%) Irganox 1035 (0.5 pph) |

The results of the strength testing are listed in table 2-4 below.

TABLE 2-4

| Fiber Coating Code | A-S 50% F.S. (kpsi) | Aged 50% F.S. (kpsi) |
|---|---|---|
| P | 777 | 702 |
| Q | 790 | 717 |
| Control-3 | 743 | 617 |

The fibers which included the inventive strength additive exhibited superior strength than the control-3 fiber. The improved fiber strength was more pronounced in the case of the aged fiber.

Example 3

Tensile Properties

The tensile properties of cured primary coating film samples were tested in accordance with ASTM D 882-97. Two control samples were also tested. The composition of each control sample are given below in table 3-1.

TABLE 3-1

| Fiber and Coating Composition Code | Primary Coating (wt % or pph) |
|---|---|
| Control 1 | BR 3731 (52%) Photomer 4003 (45%) Irgacure 1850 (3%) Irganox 1035 (1 pph) |

TABLE 3-1-continued

| Fiber and Coating Composition Code | Primary Coating (wt % or pph) |
|---|---|
| Control 2 | BR 3731 (52%) |
| | Photomer 4003 (45%) |
| | Irgacure 1850 (3%) |
| | Irganox 1035 (1 pph) |
| | Bis(trimethoxysilylethyl) benzene (2 pph) |
| | Tegorad 2200 (0.5 pph) |

The tensile properties of cured films that contained mercaptans are shown below in Table 3-2. The composition of each sample tested relates back to Table 1-1 or Table 3-1. Tegorad 2200 and bis(trimethoxysilylethyl)benzene, or bissilane, additives did not affect tensile properties to a significant extent as shown by comparing coatings of control-1 and control-2 to known values. These coatings served as controls for those that contained mercaptan additives.

The addition of low levels of mercaptans to primary coatings was not found to significantly lower the Young's modulus of cured films relative to the control films. For instance coating C, which contained 0.1 pph mercaptopropyltrimethoxysilane, had the same modulus (1.34 MPa) as the control-2 coating. When the level of mercaptopropyltrimethoxysilane was increased to 0.3 pph, as in the case of film B, the Young's modulus dropped slightly to 1.20 MPa relative to control-1 and control-2. However, the standard deviation in the measurement indicated that drop in modulus was not statistically significant. In the case of coating F that contained 0.3 pph of tert-dodecylmercaptan, the Young's modulus was determined to be 1.26 Mpa, which again was not statistically different from the control films. Also, coating G, which contained 0.3 pph 3-mercaptopropyltrimethoxysilane and no bis(trimethoxysilylethyl)benzene or other additives, showed no significant change in tensile properties compared to control-1 or control-2.

The combined addition of mercaptopropyltrimethoxysilane and Uni-tac R40 to primary coatings seemed to significantly affect the Young's modulus. The addition of 0.3 pph mercaptopropyltrimethoxysilane and 1 pph of Uni-tac R40 dropped the modulus to 1.04 MPa, which was a 22% reduction in modulus compared to the control-2 sample. However, when only 0.1 pph of mercaptopropyltrimethoxysilane was combined with 1 pph Uni-tac R40 the modulus dropped to only 1.17 MPa, which was a 13% reduction in Young's modulus. In these comparisons it was assumed that the ultimate properties were being compared in that the coatings were fully cured.

TABLE 3-2

Tensile Properties of Primary Coatings

| Coating Code | Young's Mod. in MPa (std dev) | Tensile Strength in MPa (std dev) | % Elongation (std dev) |
|---|---|---|---|
| Control-1 | 1.37 (0.13) | 1.00 (0.31) | 134.24 (31.86) |
| Control-2 | 1.34 (0.08) | 1.30 (0.50) | 150.77 (5.33) |
| B | 1.20 (0.09) | 1.08 (0.34) | 152.91 (38.31) |
| C | 1.34 (0.09) | 1.36 (0.44) | 155.01 (26.58) |
| D | 1.04 (0.05) | 0.96 (0.17) | 171.36 (24.29) |
| E | 1.17 (0.07) | 1.20 (0.37) | 162.76 (33.95) |
| F | 1.26 (0.09) | 1.12 (0.55) | 146.37 (52.95) |
| G | 1.39 (0.12) | 0.96 (0.26) | 128.66 (27.69) |

Example 4

Strength Additive Loading Effect on Young's Modulus

In addition to the modulus comparisons discussed above, a systematic loading study of mercaptopropyltrimethoxysilane, N-(tert butoxy carbonyl)-L-cysteine methyl ester, or pentaerythritol tetrakis (3-mercaptopropionate) in a primary coating composition based on control-2 was carried out. In these coatings mercaptopropyltrimethoxysilane was added to the common primary base formulation at about 0.1, 0.3, 0.5, 1.0, and 2.0 pph levels, N-(tert butoxy carbonyl)-L-cysteine methyl ester was added at levels between 0.0 to about 1.0 pph, and pentaerythritol tetrakis (3-mercaptopropionate) was added at levels between 0.0 to about 0.6 pph. The formulations were cured under the same conditions and the resulting films were tested.

Figure 5:
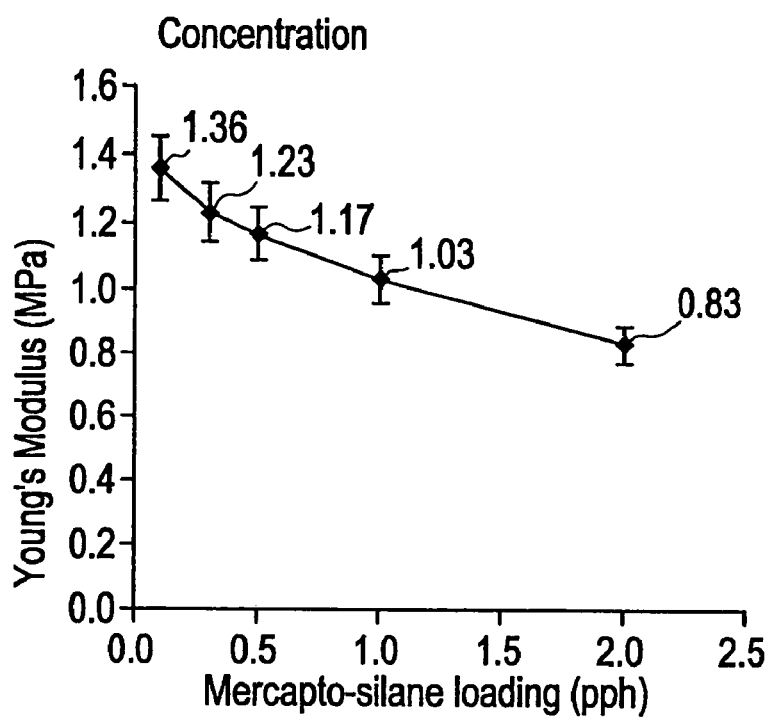
FIGS. 5-7 are plots of Young's Modulus as a function of concentration of a particular strength additive.

As shown in FIG. 5, the Young's modulus dropped with increasing loading of mercaptopropyltrimethoxysilane. At relatively high loading of the mercaptan the reduction in Young's modulus was significant, but at lower loadings (e.g. 0.1 pph or 0.3 pph mercaptan) the reduction in Young's modulus was not significant. The tensile strengths of the films also seemed to drop with increasing mercaptan concentration, but significant changes were only observed at the higher levels. No significant effect was observed for changes in % elongation at break.

Figure 6:
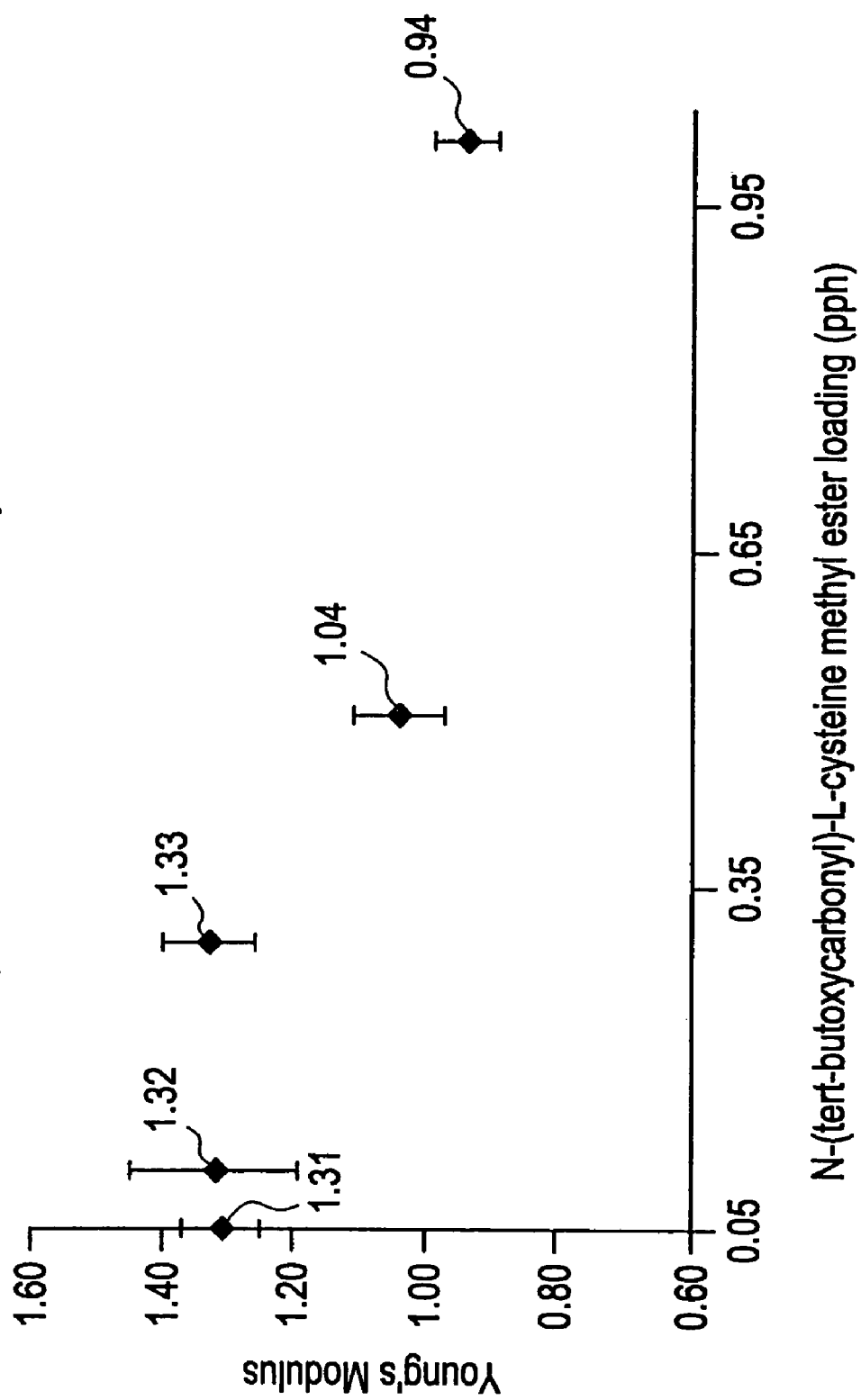
Figure 7:
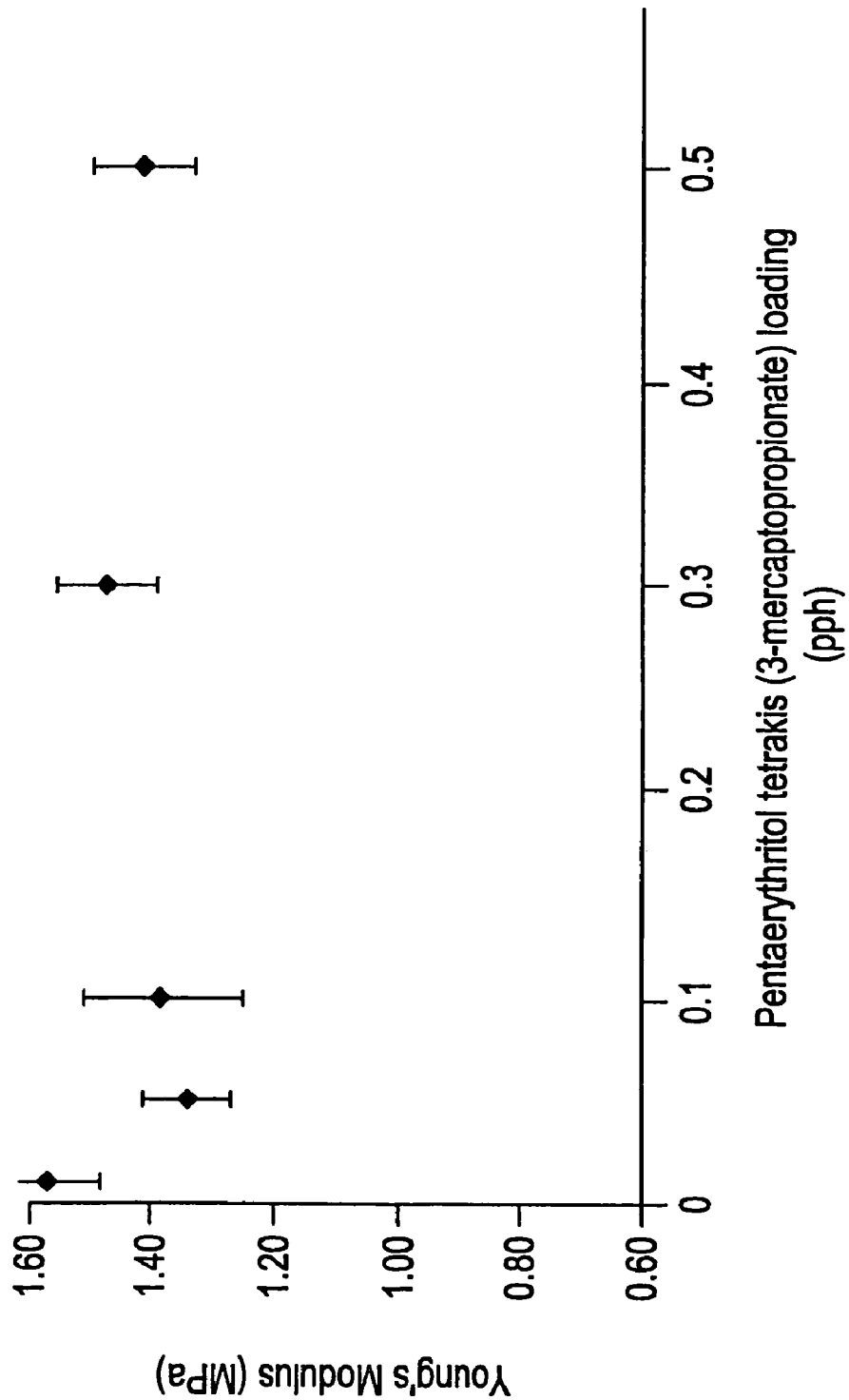

As shown in FIG. 6, the Young's modulus dropped with increasing loading of N-(tert butoxy carbonyl)-L-cysteine methyl ester. The Young's modulus dropped to less than 1.0 with more than about 0.95 pph present in the formulation. As shown in FIG. 7, the Young's modulus of pentaerythritol tetrakis (3-mercaptopropionate) did not significantly vary as the concentration of the strength additive was increased to at least about 0.5 pph.

The percentage change in Young's modulus ($\Delta Y$ %) for each strength additive is listed in the table 4-1. The Young's modulus for the control was the same as noted in Table 3-2, 1.34 MPa. The $\Delta Y$ % is calculated as follows:

$$\Delta_Y\% = 100\% * (\text{absolute value}[1.34 - \text{Young's modulus test sample}/1.34]).$$

TABLE 4-1

| | $\Delta_Y\%$ | | |
|---|---|---|---|
| PPH of Strength Additive | mercaptopropyl-trimethoxysilane | N-(tert butoxy carbonyl)-L-cysteine methyl ester | pentaerythritol tetrakis (3-mercapto-propionate) |
| 0.1 | 1% | 1% | 4% |
| 0.3 | 8% | 1% | 8% |
| 0.5 | 13% | 22% | 5% |
| 1.0 | 23% | 30% | ND |
| 2.0 | 38% | ND | ND |

ND: Not Determined

Preferably, the $\Delta Y$ % is less than about 13%, more preferably no more than about 12%, and most preferably no more than about 10%.

Example 5

Relative Cure Speed

In addition to observations of the effects of strength additives on tensile properties of primary coating films, the effect on coating cure speed was examined. Real-time Fourier Transform Infrared Spectroscopy (FTIR) was used to characterize differences in rate of propagation of coating cure for the primary coatings that varied in the same strength additives as in example 4.

About a one mil (about 25 μm) thick sample of liquid coating (uncured) was applied to a diamond coated ZnSe crystal. Prior to analysis the sample was allowed to equilibrate for about one (1) minute. A Bruker IFS-66S spectrometer was used to measure the infrared spectrum of the coating in a wavelength from about 25000 nm to about 12500 nm. The scanning of the sample was initiated about 0.9 seconds before UV exposure began to determine the uncured band ratio. The sample was exposed to an irradiator source for about one (1) second and the cure of the sample was allowed to propagate for about six (6) seconds. To establish the 100% cure level, the sample was exposed to the irradiator source for about 10 seconds (to determine the fully cured band ratio). The spectrometer was used to scan the sample continuously during the analysis. The spectrometer was able to produce a spectrum every 6 ms.

band ratio=the area of the reactive peak (acrylate)/the area of an internal standard (unreactive) peak.

% cure=[(uncured band ratio-sample band ratio)/(uncured band ratio-fully cured band ratio)]×100%.

relative cure speed=% cure/time of the exposure (units %/time).

peak cure value is the highest degree of cure attained from the 1 second exposure to the irradiator source.

The cure speed ave. is the average of three (3) runs for a given coating.

The above method of determining the cure of the coating is based on the change in acrylate functional group absorption during the cure.

Figure 8:
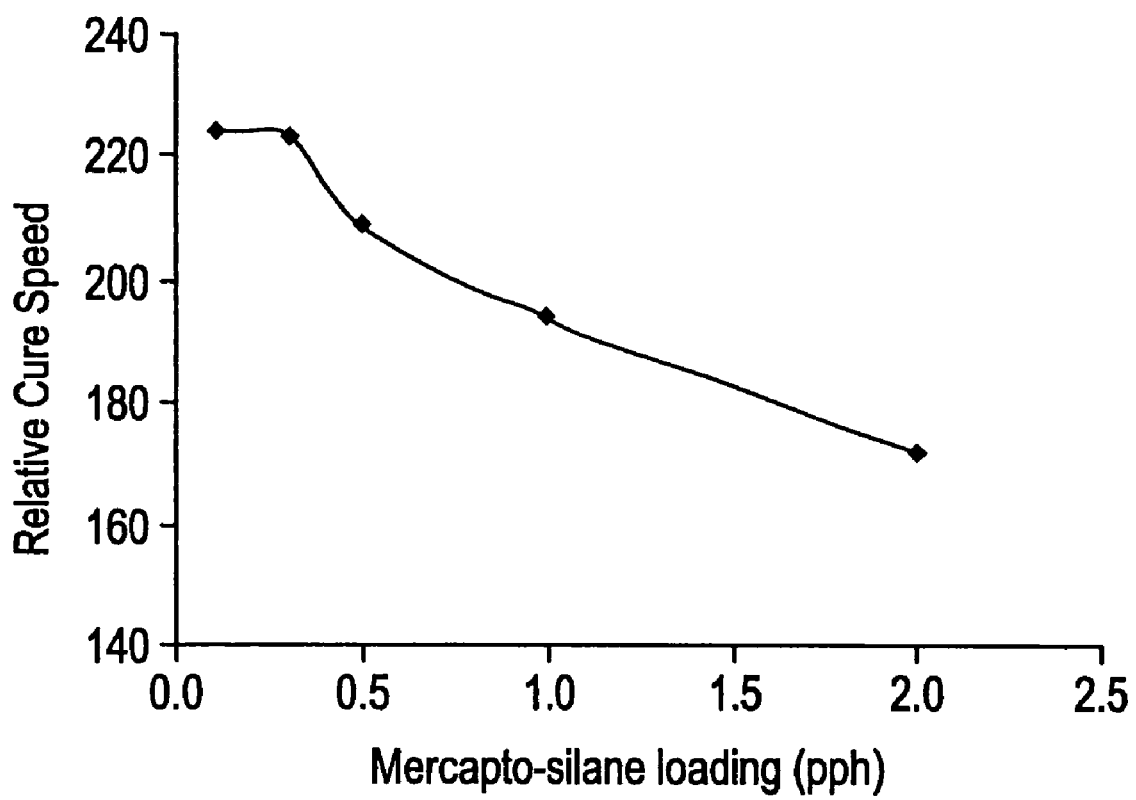
FIGS. 8-10 are plots of the relative cure speed (%/second) as a function of concentration of a particular strength additive.

As indicated in FIG. 8, the relative cure speed of formulations with low levels (<0.5 pph) of mercaptopropyltrimethoxysilane was essentially the same. Cure speed was not affected by the addition of low levels of the mercapto-silane strength additive. However, coatings with higher levels of the mercapto-silane experienced significant reductions in cure speed and also showed significant reduction in cure (see Table 5-1 below).

TABLE 5-1

Real-Time FTIR Results.

| Mercapto-silane (pph) | Relative cure speed ave. (%/s) | Peak cure value |
|---|---|---|
| 0.0 (control-2) | 219 | 93 |
| 0.1 | 224 | 93 |
| 0.3 | 223 | 93 |
| 0.5 | 209 | 91 |
| 1.0 | 194 | 90 |
| 2.0 | 172 | 88 |

Figure 9:
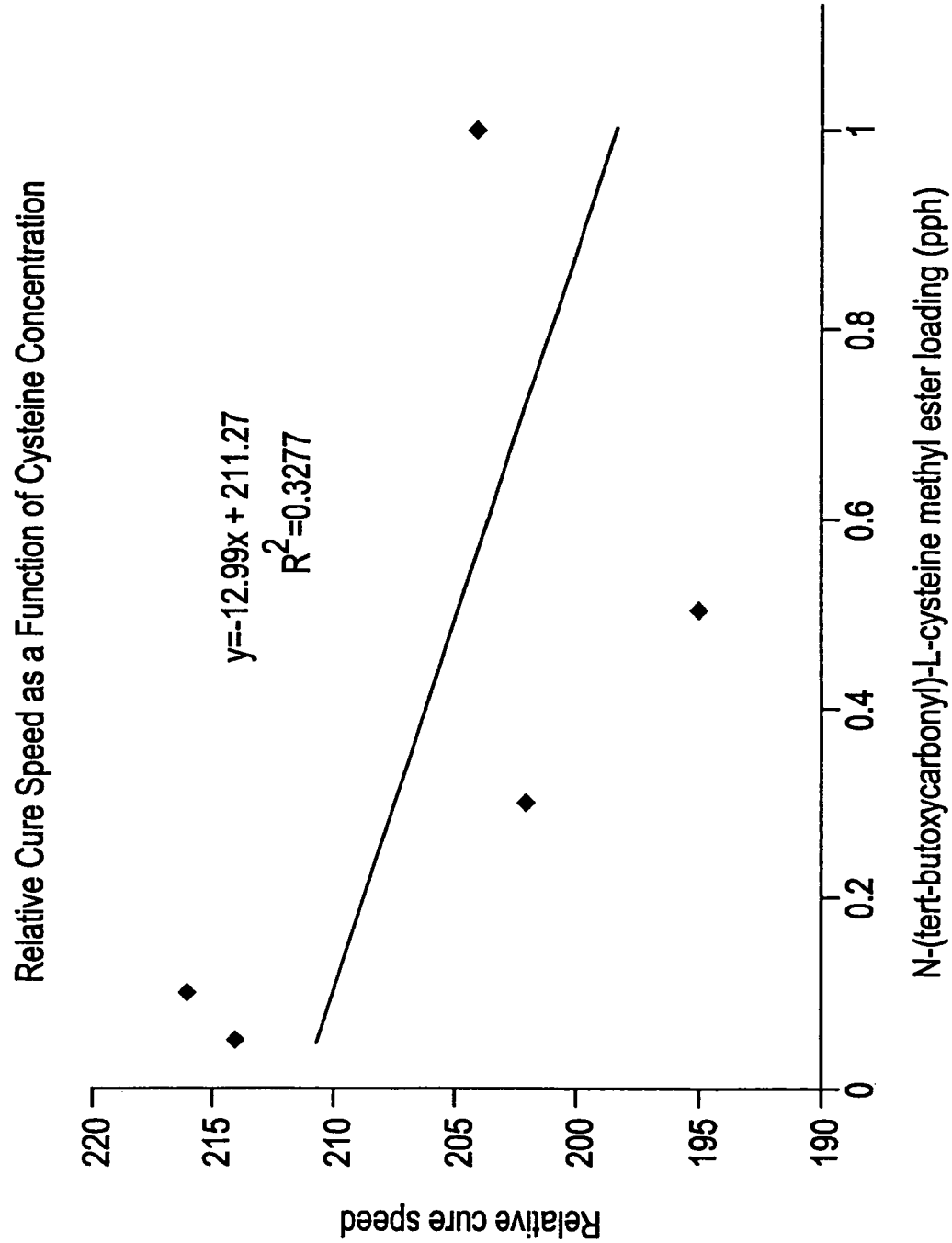
Figure 10:
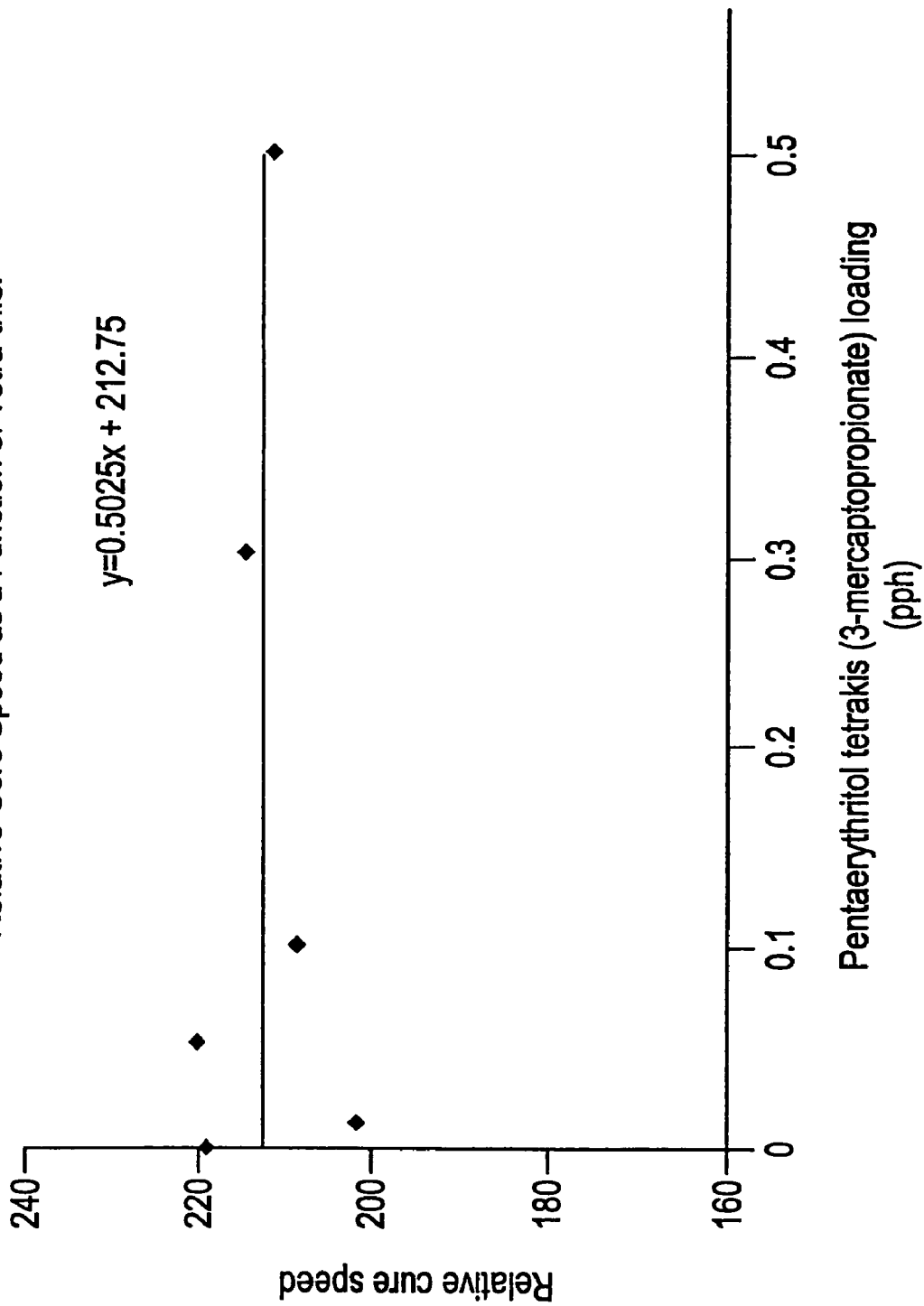

As shown in FIG. 9, the relative cure of the a composition which includes the strength additive N-(tert butoxy carbonyl)-L-cysteine methyl ester exhibited a general tend to decrease as the concentration of the strength additive in the composition increased. Unexpectedly, as shown in FIG. 10, the concentration of pentaerythritol tetrakis (3-mercaptopropionate) did not affect the cure speed of the film sample. The relative cure speed of the samples shown in FIG. 10 appeared to remain substantially constant as the concentration increased to about 0.5 pph.

The percentage change in relative cure speed ($\Delta C$ %) for each strength additive is listed in the table 5-2. The Young's modulus for the control was the same as noted in Table 5-1, 219%/s. The $\Delta_C$% is calculated as follows:

$$\Delta_C\% = 100\% * (\text{absolute value}[219 - \text{Relative Cure Speed test sample}/219]).$$

TABLE 5-2

| | $\Delta_C$% | | |
|---|---|---|---|
| PPH of Strength Additive | Mercaptopropyl-trimethoxysilane | N-(tert butoxy carbonyl)-L-cysteine methyl ester | pentaerythritol tetrakis (3-mercapto-propionate) |
| 0.1 | 2% | 2% | 4% |
| 0.3 | 2% | 8% | 3% |
| 0.5 | 5% | 11% | 6% |
| 1.0 | 11% | 7% | ND |
| 2.0 | 22% | ND | ND |

ND: Not Determined

Preferably, the $\Delta C$ % is less than about 10%, more preferably less than about 5%, and most preferably no more than about 4%.

Example 6

Fiber Testing

The test fibers were the same as the fibers of example 1. These fibers were tested for strip force, pullout, and wet adhesion. The fiber results for the control fiber were also included for comparison purposes. This control fiber was coated with the control-2 coating, which did not have a mercaptan in it, and the same secondary coating as the fiber coated with composition A. The control fiber was determined to have acceptable fiber performance in these categories.

Single fiber mechanical properties, including strip force and pullout performance, are shown in Table 6-1. The strip force was measured in accordance with FOTP 178. All fibers showed acceptable dry strip force values, although the dry strip force for fiber B was on the low side of what is desirable. Fiber A gave an low wet strip force of 0.22±0.02 lb, where the preferred specification of strip force is greater than 0.20 lb. The other fibers in this series had relatively good wet strip force performance. Fiber A was also found to have a low dry pullout value of 0.45 lb and low wet pullout value of 0.16.

Fibers B-E were found to have significantly higher dry pullout values than the control fiber and Fiber F, which contained the tert-dodecylmercaptan additive. The mercapto-silane additive significantly increased the dry pullout of fibers B-E relative to the control, however, the wet pullout of these fibers was found to be essentially the same. The fiber that exhibited strip force and pullout properties most similar to the control fiber was the Fiber F, which did not contain the mercaptopropyltrimethoxysilane but rather the aliphatic mercaptan, tert-dodecylmercaptan.

TABLE 6-1

Dry and Wet Strip Force and Pullout Values for Fibers.

| Coating on Fiber | Control | A | B | C | D | E | F | G |
|---|---|---|---|---|---|---|---|---|
| Dry Strip Force (lb) | 0.65 | 0.53 | 0.36 | 0.40 | 0.42 | 0.54 | 0.55 | 0.42 |
| DSF 95 CI | 0.09 | 0.07 | 0.02 | 0.03 | 0.03 | 0.10 | 0.12 | 0.02 |
| Wet Strip Force (lb) | 0.58 | 0.22 | 0.30 | 0.35 | 0.34 | 0.35 | 0.42 | 0.33 |

TABLE 6-1-continued

Dry and Wet Strip Force and Pullout Values for Fibers.

| Coating on Fiber | Control | A | B | C | D | E | F | G |
|---|---|---|---|---|---|---|---|---|
| WSF 95 CI | 0.08 | 0.02 | 0.01 | 0.05 | 0.03 | 0.03 | 0.09 | 0.01 |
| Dry Pullout (lb) | 0.67 | 0.45 | 1.29 | 1.48 | 2.12 | 2.24 | 0.78 | ND |
| DPO 95 CI | 0.05 | 0.03 | 0.27 | 0.33 | 0.25 | 0.47 | 0.04 | ND |
| Wet Pullout (lb) | 0.43 | 0.16 | 0.41 | 0.47 | 0.41 | 0.36 | 0.45 | 0.40 |
| WPO 95 CI | 0.05 | 0.01 | 0.03 | 0.06 | 0.04 | 0.04 | 0.10 | 0.04 |

95 CI indicates the percent confidence interval
ND: Not Determined

The wet performance of the control fiber and fibers A-G is shown in Table 6-2 below, with notes on the microscopic examination of the water-soaked fibers. As noted in Table 1-1 all fibers contained bis(trimethoxysilylethyl)benzene and differed in mercaptan additive and/or carrier additive (Tegorad 2200 and Uni-tac R40), except for fiber G which only contained the 3-mercaptopropyltrimethoxysilane additive. The fibers were soaked for 14, 30, or 60 days in 23° C. or 65° C. water baths and a 10 cm sample of each fiber was examined for water-induced delaminations and microdelamination (MD). The number of MD observed in a 10 cm sample of fiber was noted along with the size in millimeters of the largest observed MD.

Overall, all fibers exhibited relatively good MD performance, except for the fiber A. The control fiber showed only one small (0.04 mm) MD after 14 days of soaking in 65° C. water. Fiber A showed good MD performance after 30 days soaking in 23° C. or 65° C. water. However, after 60 days of soaking in 65° C. water, fiber A showed numerous (13000) MD in a 10 cm sample of fiber. Fibers B-E contained the 3-mercaptopropyltrimethoxysilane material, but did not contain the Tegorad 2200 additive and showed acceptable MD performance. Fiber F contained the bis(trimethoxysilylethyl)benzene adhesion promoter, the Tegorad2200 carrier additive, and the tert-dodecylmercaptan strength additive. Fiber F showed excellent MD performance up to 30 days soaking in 23° C. and 65° C. water. Fiber G also showed excellent MD performance up to 30 days soaking in 23° C. and 65° C. water.

raphy-mass spectrometry (GC-MS). In these experiments, the loss of active adhesion promoter was assumed to follow from hydrolysis of the Bis-silane methoxy groups and/or subsequent condensation steps. Essentially, the stability of active Bis-silane was determined by monitoring the amount of unreacted silane as a function of time under various conditions.

Nuclear Magnetic Resonance Spectroscopy (NMR)

NMR data from the adhesion promoter in these coatings were collected using a Chemagnetics Infinity NMR spectrometer, in conjunction with an 11.7 T superconducting magnet and solid state NMR probes. A Chemagnetics 7.5 mm MAS NMR probe was simultaneously tuned to 1H and 29Si (499.8 and 99.3 MHz resonance frequencies, respectively). Coating samples were loaded into a 7.5 mm zirconia rotor and sealed with Teflon® end caps and plugs. This air-tight assembly was then placed in the NMR probe and rotated about the magic angle (54.74°) at moderate spinning rates (nominally 1-2 kHz). These sample conditions, as well as the higher RF powers afforded by solid state NMR techniques, are well suited to follow the disappearance of molecular silanes (monomers) as well as the formation of polymerized species. All NMR measurements were conducted by holding the sample at the desired temperature (25° C., 35° C., or 65° C.) for the duration of the experiment, with sampling of the NMR spectra at various time intervals. Temperature control was maintained to within ±1° C. with a Chemagnetics VT-NMR controller and compressed nitrogen gas.

The NMR experiments were based on a simple single pulse excitation pulse sequence with high power proton decoupling during the data acquisition. The RF power and probe tuning were typically calibrated to provide a π/2 pulse width of 8 µsec. To avoid saturation conditions, π/4 pulse widths and moderate pulse delays were utilized (2 to 5 sec). The addition of Cr(acac)3 to the coating mixture reduced the 29Si spin-lattice relaxation time from approximately 25 sec to less than 2 sec, and is a common technique for 29Si NMR studies of silanes. This allowed for short delays and improved signal averaging, necessary for detecting changes in the 29Si NMR spectra of dilute adhesion promoter in the coating formulation.

NMR spectra were processed with minimal line broadening (typically 5-10 Hz) and referenced to an external TMS sample, with a 29Si resonance at 0 ppm. Bis-silane concentrations were determined by measuring the peak intensities in the NMR spectra, normalized to the initial concentration of unreacted Bis-silane.

TABLE 6-2

Microscopic Examination of Water-Soaked Fibers. # of MD (size in mm).

| Fiber Coating Code | Control | A | B | C | D | E | F | G |
|---|---|---|---|---|---|---|---|---|
| 14 Day 23 C | No MD | No MD | No MD | 10 (0.261) | 1 (0.09) | 1 (0.11) | No MD | No MD |
| 14 Day 65 C | 1 (0.04) | No MD | No MD | No MD | No MD | No MD | No MD | No MD |
| 30 Day 23 C | No MD | No MD | 4 (0.677) | ND | 3 (0.28) | 1 (0.39) | No MD | No MD |
| 30 Day 65 C | No MD | 1 (0.07) | No MD | ND | No MD | No MD | No MD | No MD |
| 60 Day 23 C | No MD | No MD | 5 (0.999) | ND | 2 (1.3) | 1 (1.23) | ND | ND |
| 60 Day 65 C | No MD | 13000 (0.16) | No MD | ND | No MD | No MD | ND | ND |

MD: Microdelamination
ND: Not Determined

Example 7

Shelf Life

The degradation of a Bis-silane containing adhesion promoter in model solutions and primary coatings was investigated with a variety of analytical techniques, including solid state nuclear magnetic resonance (NMR) and gas chromatog- Gas Chromatography/Mass Spectrometry (GC/MS)

Stock solutions for the GC/MS experiments were prepared by diluting Bis-silane in HPLC grade THF containing 0.021 M cyclohexyl phenyl ketone as an internal standard to give a solution with [Si(OCH3)3]=0.11 M. Cyclohexylphenylketone (CPK) was chosen as an internal standard for these experiments since it has a different retention time than the Bis-silane isomers and it not expected to react under these conditions. For mixed silane experiments, stock solutions containing the same amount of Bis-silane and 0.11M Mercapto-silane were prepared in this manner. Aliquots from the stock solution were then removed and used to prepare the GC/MS samples. All water and acid solution volumes were transferred using Eppendorf micropipettes. Cr(acac)3 was added to select samples prior to the addition of water or acid. This reagent was found to be soluble in THF to yield a sample solution containing 0.0049 M Cr(acac)3. In a typical GC/MS experiment, two control samples and one acidic degradation sample were made by adding 1 mL of the stock silane solution to a glass vial followed by 3.2 µL water and/or 1.3 µL 0.2M p-toluenesulfonic acid solution in THF, as needed. The acidic degradation samples contained water and acid, the water control samples contained water only and finally, the last control samples were merely the silane in THF. The final concentrations of the reagents in the GC/MS samples, based on silane solution volume, are: [Bis-silane]=0.054M; [Mercapto-silane]=0.11M; [H2O]=0.18M; [ptsa]=0.00026M. It should be noted that no special measures were taken to dry the THF or to keep the sample dry; the water reported is the water that was added.

Solutions prepared in this way were analyzed by injecting 1 µL aliquots into a Varian 3800 GC equipped with a Saturn 2000 ion trap mass spectrometer. Samples were monitored every seven hours over a period of 40-60 hours using an autosampler. The GC was run in split injection mode with an injector temperature of 260° C. Samples were chromatographed on a DB-5 (5% phenyl methyl siloxane) 0.25 mm×30 m capillary column. The GC temperature program consisted of holding at the initial oven temperature of 100° C. for 3 minutes, ramping up to 260° C. at a rate of 10°/min and holding at the final temperature for 10-20 minutes. Total run time was 30-40 minutes. Electron impact (EI) MS at 70 eV was performed by turning on the MS filament following a solvent delay of 3 minutes, after which masses ranging from m/z 50 to 650 were monitored for the duration of the GC run.

Kinetic analyses of the GC/MS data were done in the program Origin 6.0. The area of the trimethoxysilane peak(s) relative to the internal standard peak area were calculated and plotted against the elapsed reaction time, defined as the time between the addition of acid and/or water and the analysis.

The stability of Bis-silane in the THF/water solutions containing catalytic acid was examined using GC-MS methods, for solutions containing only Bis-silane (control solution) and a mixture of Bis-silane and Mercapto-silane (test solution). The results are plotted in FIG. 11.

Figure 11:
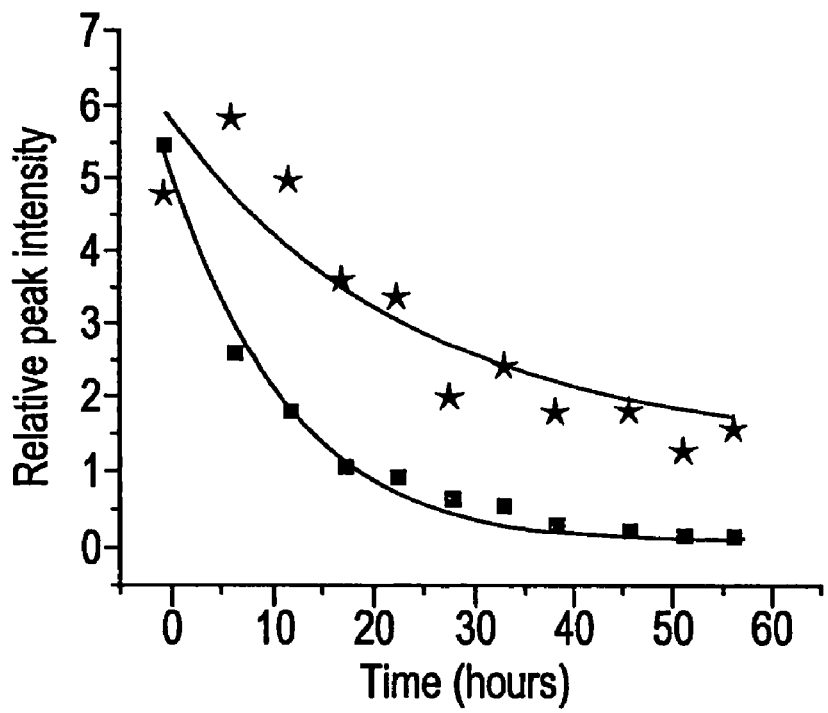
FIG. 11 is a plot of the relative peak intensity of four (4) major adhesion promoter isomers as a function of reaction time for a control solution and a test solution.

Shown in FIG. 11 is a plot of the relative peak intensity of the four major Bis-silane isomers as a function of reaction time in THF, water, and acid, generally denoted as 110. The four major Bis isomers are shown below.

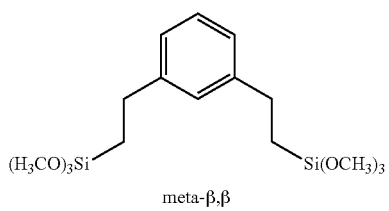

meta-β,β

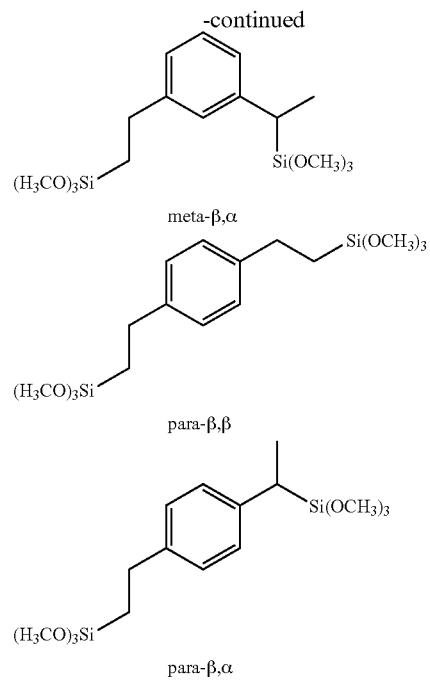

meta-β,α para-β,β para-β,α

The solid curves 112 and 114 represent first-order decay fits to the experimental data for a solution containing the Bis-silane adhesion promoter 112 (control solution) and for a solution containing the Bis-silane adhesion promoter in combination with a Mercapto-silane additive 114 (test solution).

In the absence of Mercapto-silane, a pseudo-first order exponential decay of the four major Bis-silane isomers was observed. A slower decay, following slightly different kinetics, was observed when Mercapto-silane is present in the Bis-silane solution. In the case of the combination of Bis-silane and Mercapto-silane, the Bis-silane peaks did not decay completely to zero. By assuming first-order decay behavior in the unreacted Bis-silane solutions, an estimate for the stability enhancement due to Mercapto-silane was obtained. The data showed about a 50% loss of Bis-silane after only about 8 hours, for solutions without Mercapto-silane. This "half-life" increased substantially with the presence of a Mercapto-silane, to approximately 35 hours. These solution studies supported the idea that competing hydrolysis reactions between two silanes resulted in favorable enhancements to the decay rate of one or both silanes.

Figure 12:
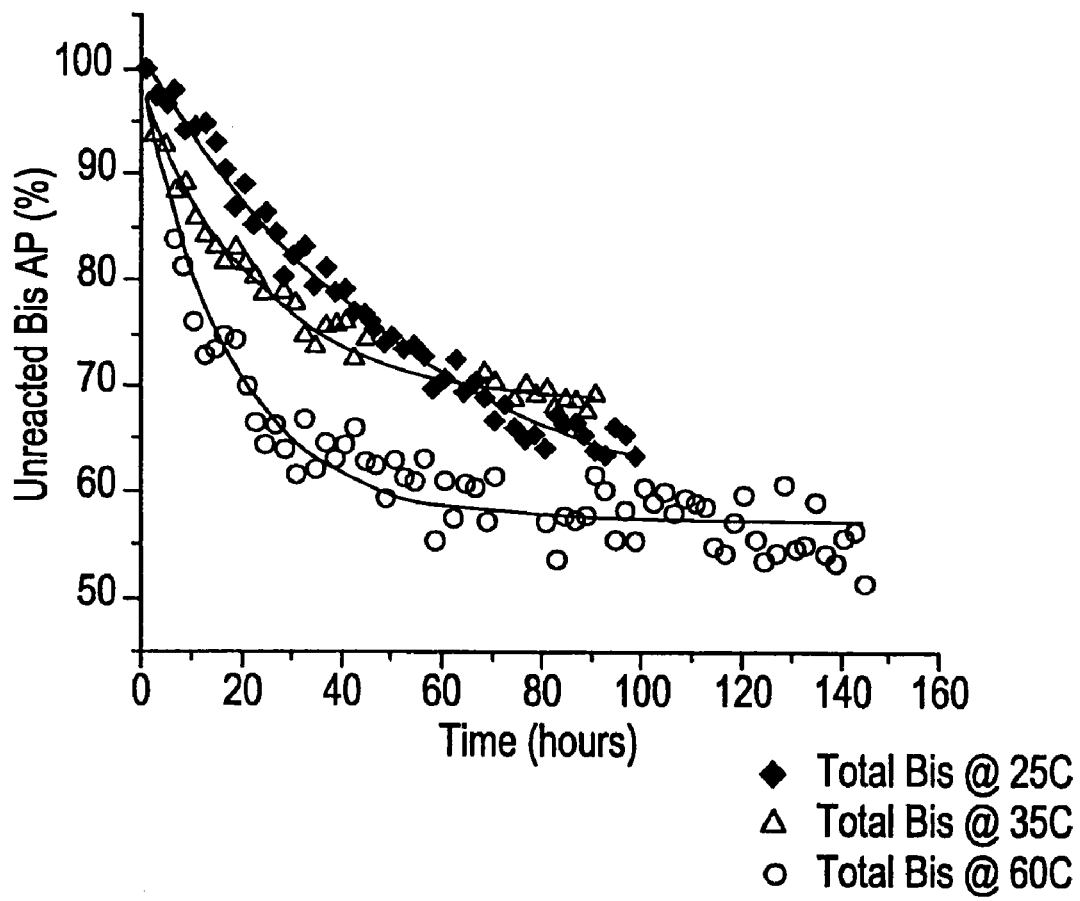
FIGS. 12-13 are plots of unreacted adhesion promoter in a coating formulation in terms of hours.
Figure 13:
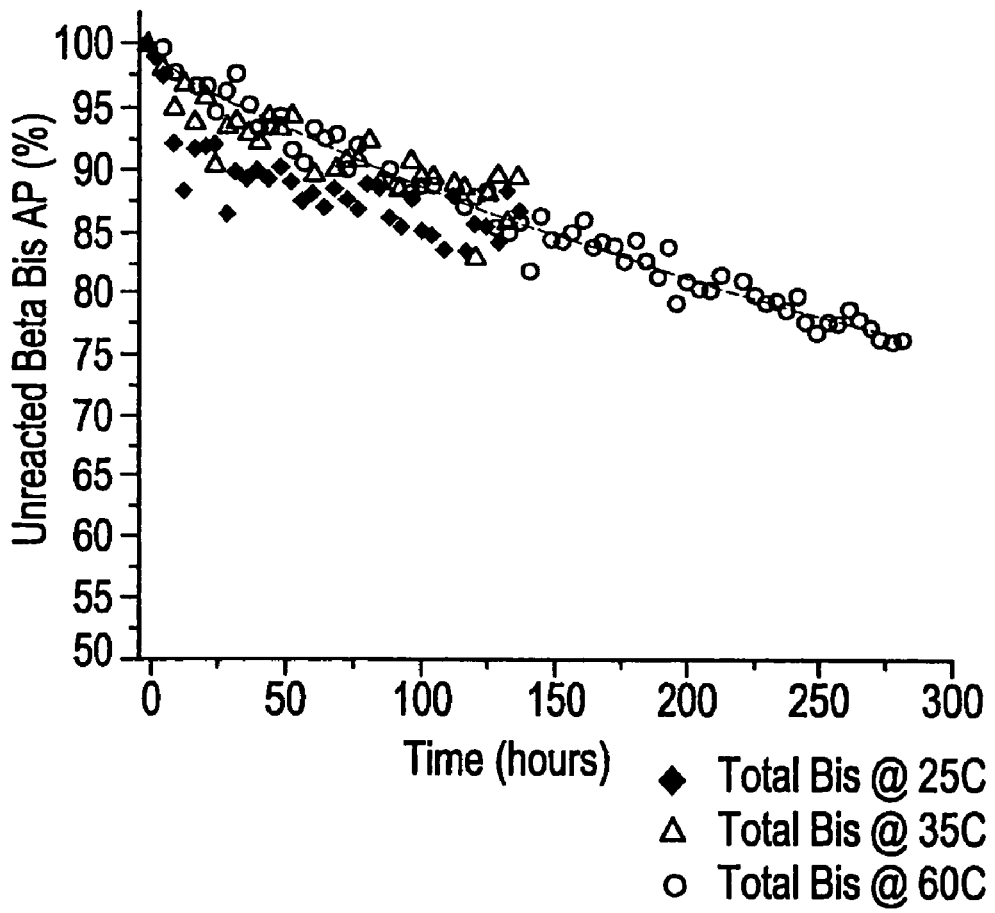

The stability of Bis-silane adhesion promoter was also characterized in two primary coating formulations, see FIGS. 12 and 13. Each coating included the same base formulation of oligomer, BR3731, Bomar Specialties, 52% by wt (polyether acrylate) monomer, Photomer 4003, Cognis (f.k.a Henkel), 45% by wt (ethoxylated phenol acrylate), adhesion promoter, bis(trimethoxysilylethyl)benzene, Gelest, 2 pph, and antioxidant, Irganox 1035, Ciba Specialty Chemicals, 1 pph. The formulation of the coating represented in plot 122 also included a photoinitiator, Irgacure 1850, Ciba Specialty Chemicals, 3% by wt. The coating represented by plot 124 included a photoinitiatior comprised of 1.5% Irgacure 184 and 1.5% Irgacure 819, both available from CIBA and 0.3 pph 3-mercaptopropyltrimethoxysilane.

NMR determinations of unreacted Bis-silane are based on monitoring the 29Si NMR resonances at −43.3 and −49.6 ppm, due to the β- and α-isomers of trimethoxy Bis-silane. Hydrolysis of any of these methoxy groups, as well as any condensation between silanes, significantly shifted the 29Si NMR resonances of those species. The relative concentrations of unreacted Bis-silane were therefore monitored accurately, even in multi-component primary coatings. The 29Si MAS NMR data for Bis-silane adhesion promoter in a primary coating formulation, 122, is shown in FIG. 12. The only silane additive in this formulation was the Bis-silane adhesion promoter, so the date served as a basis for assessing the stability of Bis-silane without influence from a second silane additive.

As these NMR data indicated, the unreacted Bis-silane concentration was affected by time and also temperature. Because of water contamination in these primary coatings, the loss of unreacted Bis-silane was attributed to hydrolysis and condensation of the silanes, resulting in a substantial loss of reactive adhesion promoter. The total water content in coating formulations can vary, influencing the total amount of Bis-silane degradation. The final equilibrium values of unreacted Bis-silane in FIG. 12 are mostly dictated by the total water content. The different rates of decay are a reflection of the temperature-dependent kinetics. Higher temperatures hasten (worsen) the decay of unreacted Bis-silane.

Similar data were obtained for the primary coating represented by line 124, which contains both Bis-silane and Mercapto-silane. In that case, the Mercapto-silane was added as a strength additive. 29Si NMR data for the coating 124 at various temperatures were plotted in FIG. 13. It is obvious from the data that the degradation of Bis-silane in coating 124 did not reach a constant level within the time span of the NMR measurements. Even at about 60° C. for about 280 hours, the Bis-silane continues to slowly decay. As mentioned above, the extent of Bis-silane degradation was mostly determined by the amount of water in the coating. The important trend in the data is that the presence of Mercapto-silane has significantly reduced the degradation rate for Bis-silane, and in addition, removed any temperature dependence of this degradation. The second point has obvious ramifications in manufacturing of these coatings.

The effect of Mercapto-silane on Bis-silane degradation is quite similar to that observed in the solution studies by GC-MS. Comparison of the NMR data for the coating 122 and coating 124 (FIGS. 12 and 13), confirmed a distinct difference in Bis-silane degradation rates. As with the GC-MS studies of model solutions, the actual degradation rates were measured assuming first-order exponential decay behavior of the NMR data. This analysis shows that for the primary coatings held at 25° C. for 100 hours, the remaining active Bis-silane in coating 122 is only about 63%. Conversely, the active Bis-silane in coating 124 after about 100 hours at about 25° C. is about 89%. This points toward using a second silane (Mercapto-silane) additive as an efficient method for extending the shelf life of primary coatings containing Bis-silane adhesion promoters.

The data and brief discussions relate to an invention for extending the shelf life of optical fiber primary coatings. In this specific example, the use of both Mercapto-silane and Bis-silane in the coating substantially decreased the loss of active adhesion promoter, thus allowing for good wet adhesion in fiber coated with older coatings. The competing chemistries of these silanes are such that the less critical (spectator) silane additive preferentially reacts with any water contamination in the coating, reducing the amount of potential hydrolysis of the adhesion promoter. In this view, any silane additive, which reacts relatively faster with water, can be added to primary coatings to enhance the stability of the silane containing adhesion promoter and ultimately the coating shelf-life. This synergistic use of multiple silane additives will improve the fiber strength and shelf life of the optical fiber coatings.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical fiber comprising a glass core and a glass cladding, and a cured primary coating applied to said optical fiber, said cured primary coating comprising a Young's modulus less than 5 MPa and having a refractive index which is higher than that of the cladding of the optical fiber, said cured primary coating being the cured product of a composition comprising:
   a urethane acrylate oligomer,
   an acrylate monomer,
   a photoinitiator,
   a non-thiol functional adhesion promoter, and
   at least one thiol strength additive, wherein said at least one strength additive is present and comprises less than 0.3 parts per hundred (pph) by weight of mono-functional thiol in the composition or less than about 0.5 pph by weight of a multi-functional thiol in the composition.

2. The fiber according to claim 1 wherein said thiol strength additive comprises an organic thiol compound that includes at least one element selected from the group of elements consisting of C, H, N, O, Si, P, F, Cl, Br, I, Ti, Zr, S and mixtures thereof, in addition to an S element in said thiol functional group.

3. The fiber according to claim 1 wherein said strength additive comprises an alkyl thiol compound.

4. The fiber according to claim 3 wherein said alkyl thiol comprises at least one compound selected from the following group of compounds consisting of methane thiol, ethane thiol, hexane thiol, dodecane thiol, octadecane thiol, a cysteine derivative, a multi-functional thiol, thiol silane, thiol-functional polysulfides, and mixtures thereof.

5. The fiber according to claim 3, wherein said adhesion promoter comprises bis(trimethoxy silylethyl)benzene.

6. The fiber according to claim 1 wherein said strength additive comprises at least one compound selected from the group of compounds consisting of N-(tert butoxy carbonyl)-L-cysteine methyl ester, pentaerythritol tetrakis (3-mercaptopropionate), 3-mercaptopropyl trimethoxy silane, 3-mercaptopropyl triethoxy silane, dodecylmercaptan, and mixtures thereof.

7. The fiber according to claim 1 wherein said concentration of said strength additive comprises up to about 0.3 pph by weight.

8. The fiber according to claim 1 wherein said concentration of said strength additive comprises up to about 0.1 pph by weight.

9. The fiber according to claim 1 wherein said strength additive comprises 3-mercaptopropyltrimethoxy silane.

10. The fiber according to claim 1 wherein said strength additive comprises tert-dodecylmercaptan.

11. The fiber according to claim 1 wherein said strength additive comprises pentaerythritol tetrakis (3-mercaptopropionate).

12. The fiber according to claim 1 wherein said adhesion promoter includes at least one compound from the group of compounds consisting of a silane, a titanate, a zirconate, and mixtures thereof.

13. The fiber according to claim 1 wherein said adhesion promoter comprises a titanate containing compound.

14. The fiber according to claim 1 wherein said adhesion promoter comprises a zirconate containing compound.

15. The fiber according to claim 1, wherein said adhesion promoter comprises methacryloxy-propyltrimethoxy silane.

16. The fiber according to claim 1, wherein a difference in Young's modulus of the cured primary coating composition and of an otherwise identical cured coating composition without said strength additive is no more than about 12%.

17. The fiber according to claim 1, wherein the primary coating has a thickness of at least about 20 microns and, when uncured, is capable of being cured to at least about 70% at an average rate of at least about 180%/second.

18. The fiber according to claim 1, where said strength additive comprises a monofunctional or multifunctional thiol present in an amount of at least about 0.01 pph by weight.

19. The fiber according to claim 18 wherein said strength additive comprises a single thiol additive comprising a monofunctional thiol in an amount less than 0.3 pph by weight.

20. The fiber according to claim 18 wherein said strength additive comprises a single thiol additive comprising a monofunctional thiol in an amount less than 0.1 pph by weight.

21. The fiber according to claim 18 wherein said strength additive comprises a single thiol additive comprising a multifunctional thiol in an amount less than about 0.5 pph by weight.

22. The fiber according to claim 18 wherein said strength additive comprises a single thiol additive comprising a multifunctional thiol in an amount less than about 0.3 pph by weight.

* * * * *